(12) United States Patent
Kano et al.

(10) Patent No.: US 8,239,254 B2
(45) Date of Patent: Aug. 7, 2012

(54) ADVERTISEMENT DISTRIBUTION SYSTEM AND ADVERTISEMENT DISTRIBUTION METHOD

(75) Inventors: Yoshiki Kano, Sagamihara (JP); Akira Yamamoto, Sagamihara (JP); Atsuo Kawaguchi, Sagamihara (JP); Shoji Kodama, Sagamihara (JP); Naoko Iwami, Sagamihara (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

(21) Appl. No.: 12/048,332

(22) Filed: Mar. 14, 2008

(65) Prior Publication Data

US 2009/0171785 A1 Jul. 2, 2009

(30) Foreign Application Priority Data

Dec. 27, 2007 (JP) ................................. 2007-337701

(51) Int. Cl.
*G06Q 40/00* (2012.01)
(52) U.S. Cl. ........................................................ 705/14
(58) Field of Classification Search ...................... 705/14
See application file for complete search history.

(56) References Cited

U.S. PATENT DOCUMENTS

| | | | |
|---|---|---|---|
| 6,721,955 B2 * | 4/2004 | Khoo et al. ...................... 725/46 |
| 2003/0229819 A1 | 12/2003 | Kodama | |
| 2003/0236850 A1 | 12/2003 | Kodama | |
| 2004/0054577 A1 * | 3/2004 | Inoue et al. ...................... 705/14 |
| 2005/0144073 A1 * | 6/2005 | Morrisroe et al. ............... 705/14 |
| 2006/0116924 A1 * | 6/2006 | Angles et al. .................... 705/14 |
| 2006/0147184 A1 | 7/2006 | Hiroi et al. | |
| 2006/0184502 A1 | 8/2006 | Achiwa et al. | |
| 2008/0235090 A1 * | 9/2008 | Lundstrom et al. .............. 705/14 |
| 2010/0030645 A1 * | 2/2010 | Watanuki et al. ........... 705/14.53 |

FOREIGN PATENT DOCUMENTS

| JP | 2003-15933 | 1/2003 |
|---|---|---|
| JP | 2006-180306 | 7/2006 |

OTHER PUBLICATIONS

"Reviewer's Guide for Windows Home Server", Microsoft Corporation, Sep. 2007, Version: 1.oa.

* cited by examiner

*Primary Examiner* — Jessica Lemieux
(74) *Attorney, Agent, or Firm* — Antonelli, Terry, Stout & Kraus, LLP.

(57) ABSTRACT

A home storage (a first storage device) installed in each home is provided with an area for a user to store data (user area) and an area for storing ads (ad area). The first storage device checks interest and favorite information for the user in the user area, and transmits the interest and favorite information at the same time backup is performed in a second storage device at a remote site. The second storage device selects a suitable ad based on the interest and favorite information from the first storage device and transmits the selected ad to the first storage device. The user views the transmitted ad when viewing content in the first storage device. The user's viewing record for the ads is kept as statistical data, and the second storage device compiles the record, charges a sponsor an ad charge, thereby subsidizing the usage charge for the first storage device regardless of online or offline connection.

12 Claims, 36 Drawing Sheets

FIG.10A

SERIAL # : 1000102031 — 2056

| AREA NAME(2041) | START(2042) | SIZE(2043) |
|---|---|---|
| SYSTEM AREA(2044) | 0GB | 10GB |
| ... | ... | ... |
| ENTIRE STORAGE AREA(2045) | 0GB | 1TB |

| ITEM(2051) | AMOUNT(2052) |
|---|---|
| STANDARD BASIC CHARGE | ¥1000 |

| ITEM(2056) | CAPACITY(2057) |
|---|---|
| FREE AD STORAGE AREA | 800GB |

USER DEFINITION INFORMATION
ALREADY CONFIGURED (2080) : ON
IP ADDRESS (2081) : 192.168.0.3
HOST NAME (2082) : homestorage

FIG.11A

| AREA NAME (2061) | START (2062) | SIZE (2063) | END (2064) |
|---|---|---|---|
| AD-USE STORAGE AREA (2065) | 10GB | 720GB | 730GB |
| HOME-USE STORAGE AREA (2066) | 730GB | 270GB | 270GB |
| ... | ... | ... | ... |

| ITEM | AMOUNT |
|---|---|
| DISCOUNT PRICE (2071) | ¥900 |
| DISCOUNTED BASIC CHARGE (2072) | ¥100 |

| ITEM | % |
|---|---|
| AD PERCENTAGE | 90% |

SERIAL #1000102031    USER NAME:A

| FILE NAME (2221) | DATE (2222) | TIME (2223) | DATA TYPE (2224) | INFORMATION TAG 1 (2225) | TAG FORM 1 (2226) | TAG 1 VALUE 1 (2227) | TAG 1 FORM 2 (2228) | TAG 1 VALUE 2 (2229) | TAG 1 SUMMARY METHOD (2230) | TAG 1 SUMMARY VALUE 1 (2231) | ... |
|---|---|---|---|---|---|---|---|---|---|---|---|
| HIT00001.JPG | 11/15 | 10:00 | JPG | GPS | LONGITUDE | 34 degrees and 23 minutes | LATITUDE | 133 degrees and 27 minutes | REGION | HIROSHIMA | ... |
| HIT00002.MP4 | 11/15 | 10:10 | MP4 | GPS | LONGITUDE | 24 degrees and 24 minutes | LATITUDE | 133 degrees and 27 minutes | REGION | OITA | ... |
| HIT00003.MOV | 11/15 | 10:20 | MOV | ANALYSIS 1 | KEYWORD 1 | CHILD | NULL | NULL | NULL | NULL | ... |
| ... | ... | ... | ... | ... | ... | ... | ... | ... | ... | ... | ... |
| HIT00003.MOV | 11/16 | 13:01 | MOV | ANALYSIS 1 | KEYWORD | DOG | NULL | NULL | NULL | NULL | ... |

| # | DATA TYPE (2241) | NORMALIZATION (2242) | USAGE INFORMATION (2243) | STORAGE TAG (2244) |
|---|---|---|---|---|
| 1 | JPG | NORMALIZATION BASED ON REGION | GPS TAG | REGION |
| 2 | MOV | CONVERT SOUND IN VIDEO INTO PLAIN TEXT AND EXTRACT FREQUENCY KEYWORD | SOUND IN MOVIE | KEYWORD |
| ... | ... | ... | ... | ... |

| POLICY (2251) | SCHEDULE (2252) | TIME (2253) | METHOD (2254) |
|---|---|---|---|
| DAILY | DAILY | AM00:00 | DIFFERENTIAL BACKUP |
| WEEKLY | SUNDAY | AM00:00 | DIFFERENTIAL BACKUP |
| MONTHLY | ONE DAY | AM00:00 | FULL BACKUP |
| ... | ... | ... | |

2250

| TIME (2271) | BACKUP METHOD (2272) |
|---|---|
| 4:00 | FULL BACKUP |
| ... | ... |
| ... | ... |

TABLE IN CENTER

| SERIAL # (2311) | USER (2312) | FILE NAME | DATE | TIME | REFERENCE DATA TYPE | INFORMATION TAG 1 | TAG 1 FORM 1 | TAG 1 VALUE 1 | TAG 1 FORM 2 | TAG 1 VALUE 2 | TAG 1 SUMMARY METHOD | TAG 1 SUMMARY VALUE 1 | ... |
|---|---|---|---|---|---|---|---|---|---|---|---|---|---|
| 1000102031 | User A | HIT00001.JPG | 11/15 | 10:00 | JPG | GPS | LONGITUDE | 34 degrees and 23 minutes | LATITUDE | 133 degrees and 27 minutes | REGION | HIROSHIMA | ... |
| 1000102031 | User A | HIT00002.MP4 | 11/15 | 10:10 | MP4 | GPS | LONGITUDE | 24 degrees and 24 minutes | LATITUDE | 133 degrees and 27 minutes | REGION | OITA | ... |
| 1000102031 | User A | HIT00003.MOV | 11/15 | 10:20 | MOV | ANALYSIS 1 | KEYWORD | CHILD | NULL | NULL | | | ... |
| ... | ... | ... | ... | ... | ... | | | | | | | | |

STATISTICAL DATA

| # (2320) | KEYWORD (2321) | PERCENTAGE (2322) | CHARGE PER SECOND (2323) |
|---|---|---|---|
| 1 | HIROSHIMA | 60% | ¥60 |
| 2 | CHILD | 30% | ¥30 |
| ... | ... | ... | ... |
| 100 | TOKYO | 1% | ¥1 |
| 101 | HIRATSUKA | 1% | ¥1 |
| 103 | OITA | 1% | ¥1 |

FIG.22B

REGISTERED AD DATA

| Index (2321) | TARGET (2332) | AD TIME (SEC) |
|---|---|---|
| 000003 | HIROSHIMA | 00:10 |
| 000001 | CHILD | 00:30 |
| ... | ... | ... |
| 000010 | * | 0:10 |

USER-SET VALUE

| DISPLAY TIME (SEC) (2341) | NUMBER OF SIMULTANEOUS BROWSING USERS (2342) | TOTAL (TIME × NUMBER OF BROWSING USERS) (2343) |
|---|---|---|
| 10 | 100 | ¥60000 |
| 30 | 300 | ¥270000 |
| ... | ... | ... |
| 10 | 1000 | ¥1000 |

LIST IN CENTER

| Index (2341) | USER(2342) | FILE(2343) | KEYWORD 1 (2344) |
|---|---|---|---|
| 000001 | User1 | CM00001.MP4 | CHILD |
| 000002 | User2 | CM00002.JPG | OITA |
| 000003 | User1 | CM00003.MP4 | HIROSHIMA |
| ... | ... | ... | |

REGISTERED AD DATA (2360)

| Index (2361) | TARGET (2362) | AD TIME (SEC) | ONLINE CONTENT URL (2363) | OFFLINE (2364) |
|---|---|---|---|---|
| 000001 | CHILD | 00:30 | http://www.hi tachi.com/child | 010001 |
| 000003 | HIROSHIMA | 00:10 | http://ccc.com | 010003 |
| ... | ... | ... | ... | ... |
| 000010 | * | 0:10 | | Upload 2367 |

2365 — CANCEL

| Index (2371) | FORM (2372) | AD TIME (SEC) (2373) | RELEVANT KEYWORD (2374) | ONLINE CONTENT URL (2375) | OFFLINE CONTENT INDEX (2376) |
|---|---|---|---|---|---|
| 000001 | MP4 | 00:30 | CHILD | http://www.hitachi.com/child | 010001 |
| 000002 | JPG | - | ... | http://www.hitachi.jp/com | 010002 |
| 000003 | MP4 | 00:10 | HIROSHIMA | http://ccc.com | 010003 |
| | | | ... | | ... |

| Index (2391) | REFERENCE TIME (SEC) (2394) | BALANCE (2395) |
|---|---|---|
| 000001 | 100 | ¥1077000 |
| ... | | |
| 000003 | 600 | ¥108000 |
| ... | | |
| 000010 | 29 | ¥971 |

| Index (2417) | FILE NAME (2418) | TARGET (2419) | DISPLAY TIME (SEC) (2420) | ONLINE URL (3001) | OFFLINE FILE (3002) |
|---|---|---|---|---|---|
| 000003 | CM00003.MP4 | HIROSHIMA | 10 | http://www.hitachi.com/child | 010003 |
| 000001 | CM00001.MP4 | CHILD | 30 | http://ccc.com | 010001 |
| ... | | ... | ... | | |
| 000010 | CM00010.JPG | * | 10 | http://www.aaa.go.jp | 010020 |

3000

| Index (2801) | VIEWING TIME COUNTER (SEC) (2802) |
|---|---|
| 000003 | 111 |
| 000001 | 20 |
| ... | 2 |
| 000010 | 10 |

2800

US 8,239,254 B2

ADVERTISEMENT DISTRIBUTION SYSTEM AND ADVERTISEMENT DISTRIBUTION METHOD

CROSS-REFERENCES TO RELATED APPLICATIONS

This application relates to and claims priority from Japanese Patent Application No. 2007-337701, filed on Dec. 27, 2007, the entire disclosure of which is incorporated herein by reference.

BACKGROUND

1. Field of the Invention

The invention relates generally to an advertisement distribution system, and more specifically to an advertisement distribution system that distributes, when record data is distributed from a backup storage that backs up record data in a home storage, an ad (advertisement) together with the record data.

2. Description of Related Art

Gyao (www.gyao.jp) is known as a system for distributing television programs and movies via the Internet to a home personal computer (PC) at low cost. In services provided by Gyao, ads are displayed before and after a television program on a PC through which a user views the program. In this system, the distributed ads cannot be skipped, and instead, the user can watch the television program without charge. This system has a problem in that a television program creator can store data, but a user cannot store personal content and distribute their contents. Also, the system has another problem in that a user need to connect to the Internet every time he/she watches video such as television programs, so the user cannot watch video when traveling.

Of storage devices configured to store content created by users, Windows Home server (http://www.microsoft.com/japan/windows/pr oducts/winfamily/windowshomeserver/default.mspx) produced by Microsoft (registered trademark) has been known. This storage device stores files created by a user, closes the files in the storage device and performs backup. However, there have not been techniques for making this storage device available at low cost and storing backed up data at a remote site (see reference 1: "Reviewer's Guide for Windows Home Server," Microsoft Corporation, September 2007 (http://download.microsoft.com/download/b/4/9/b491dc53-fbbf-4763-9c7d-bc6657776450/WHS_Reviewer_Guide.pdf), and reference 2: "Gyao Media Guide," Gyao Business, USEN CORPORATION, Oct. 10, 2007 (http://www.gyao.jp/ad/gyao_mediaguide1012.zip)).

Although the above technique can store a user's data, files stored by the user cannot be referred to offline and at low cost.

SUMMARY

It is an object of this invention to provide a storage system capable of receiving ads in order to store content created by a user at low cost.

Provided according to an aspect of this invention is a system that consists of: a first storage device installed in each home; a content player such as a first personal computer and a television apparatus (hereinafter abbreviated as a "TV set") that refers to content stored in the first storage device; a second storage device installed in a remote center; and a second personal computer that stores an ad in the second storage device. The content player and the first storage device are connected to each other via a local area network (LAN 13), the first storage device and the second storage device are connected to each other via a wide area network (WAN), and the second storage device and the second personal computer are connected to each other via a wide area network (WAN).

The first storage device has storage areas for home use and for ad use and data in the home-use storage area is backed up in the second storage device in a backup center (hereinafter referred to as a "center"). When the data is backed up, interest and favorite information created based on meta information in content stored in the user storage area is also transferred to the center. The center stores ads and interest and favorite information relating to each ad, which have been stored by a sponsor using the second personal computer, and the second storage device selects a suitable ad based on the interest and favorite information (hereinafter also referred to as "target information") and distributes the selected ad with the target information for this ad to the ad-use storage area in the first storage device. The first storage device matches the latest interest and favorite information in the first storage device with the target information and displays a suitable ad when the user plays/views the content.

With this invention, the backup storage can provide, when distributing backed-up record data, an ad suitable at the time of the distribution.

Other aspects and advantages of the invention will be apparent from the following description and the appended claims.

BRIEF DESCRIPTION OF THE DRAWINGS

FIGS. 10A to 10C show definition information tables for a system in the first storage device according to the above embodiment.

FIGS. 11A to 11D show user definition information tables in the first storage device according to the above embodiment.

FIG. 15 shows a table for interest and favorite information created in the first storage device according to the above embodiment.

FIG. 16 is a data type table showing methods for normalizing the interest and favorite information extracted by the first storage device according to the above embodiment.

FIG. 17 is a table showing a backup policy for backup performed by the first storage device according to the above embodiment.

FIG. 21 is a table showing interest and favorite information relating to a plurality of first storage devices managed by the second storage device according to the above embodiment.

FIGS. 22A to 22C are diagrams showing statistical data for the interest and favorite information, registered ad data and user setting value data managed by the second storage device according to the above embodiment.

FIG. 23 is an ad file list registered in the second storage device according to the above embodiment.

FIG. 25 shows a GUI for the link setting registered by the second storage device for each ad file according to the above embodiment.

FIG. 26 is a table showing the link setting registered by the second storage device for each ad file according to the above embodiment.

FIG. 28 is a balance management table for each ad managed in the second storage device according to the above embodiment.

FIG. 31 is a transfer file list for ads created in the second storage device according to the above embodiment.

—FIG. 38A shows an MPEG4 format and FIG. 38B shows the MPEG4 format when an ad is introduced.

DETAILED DESCRIPTION OF PREFERRED EMBODIMENTS

Embodiments of this invention will be described with reference to the attached drawings. In the embodiments below, the object that enables a user to store user content in a storage device and access the content at low cost is realized irrespective of connection status with a backup center.

First Embodiment

Figure 1:
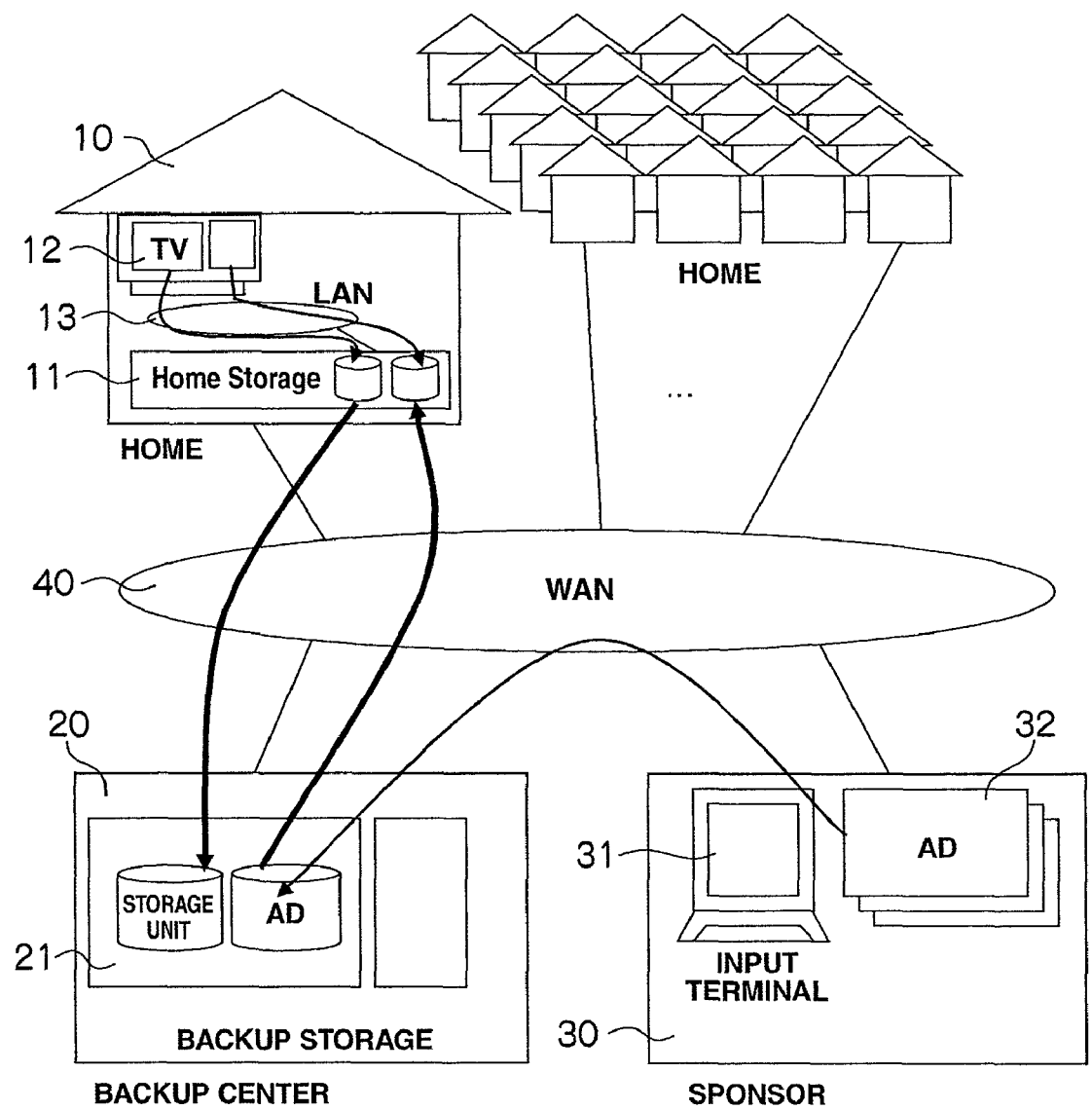
FIG. 1 is an explanatory diagram showing the entire concept of a first embodiment of this invention.

FIG. 1 is a conceptual configuration diagram showing a system of this invention. The system consists of: a first storage device 11 installed in home 10 (hereinafter also referred to as a "home storage"); a second storage device 21 located in a backup center 20 (hereinafter also referred to as a "backup storage"); and a personal computer 31 which serves as an input terminal owned by a sponsor 30. The first storage device 11 and the backup storage 21 are connected to each other via a wide area network (WAN) 40 such as the Internet, an ATM, a frame relay, a lease data communication line or etc. The sponsor 30 and the backup center 20 may also be connected to each other by a WAN.

One or more first storage devices 11 are installed in each home and connected to a LAN 13 installed in each home. Connected by Ethernet (registered trademark), power line communication (PLC) or wireless LAN (IEEE 802.11a, b, g, etc.) as a physical layer, the LAN 13 conducts communication using a code correction protocol such as Transmission Control Protocol/Internet Protocol (TCP/IP).

A television 12, a personal computer (not shown), a digital camera (shown in FIG. 6), a video camera (shown in FIG. 6) or a video recorder (not shown) are connected to the LAN 13 and content created by a user is stored in a user storage area (to be described later) in the first storage device 11. Data is backed up periodically in the backup storage 21 in the backup center 20, and a suitable ad is selected from ad information 32 provided by the sponsor 30 in the backup center 20 and provided to the first storage device 11.

The user reproduces content together with the ad using content reproduction software in the television 12 or in the personal computer or using a content reproduction homepage provided by the home storage 11. Specific operations will be described below with physical and logical configurations.

Figure 2:
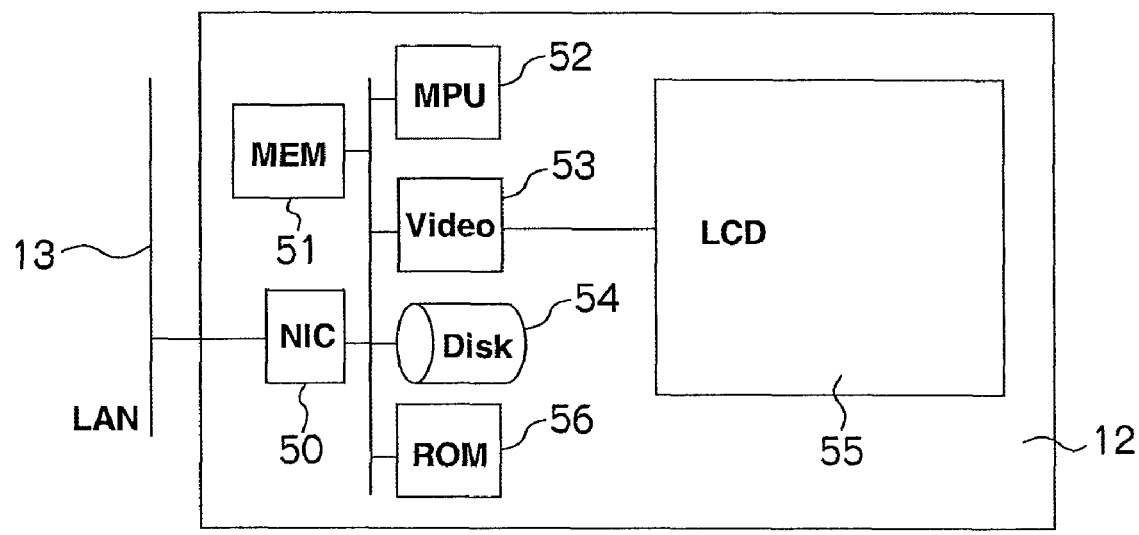
FIG. 2 is a hardware configuration diagram focusing on a TV set according to the above embodiment.

FIG. 2 is a physical configuration diagram showing the television 12 that receives user content. The television 12 consists of: an MPU (Micro Processing Unit) 52 that performs picture processing and processing for connecting the TV set 12 to the external LAN 13; a memory (MEM) 51; a video chip (Video) 53 that outputs video; an NIC (Network Interface Card) chip 50 for connecting the television 12 to the LAN 13; a disk 54 for storing recorded television programs and the like; a ROM (Read Only Memory) 56 that stores the television programs; and a monitor such as an LCD (Liquid Crystal Display) 55 or a plasma display for displaying video.

Figure 3:
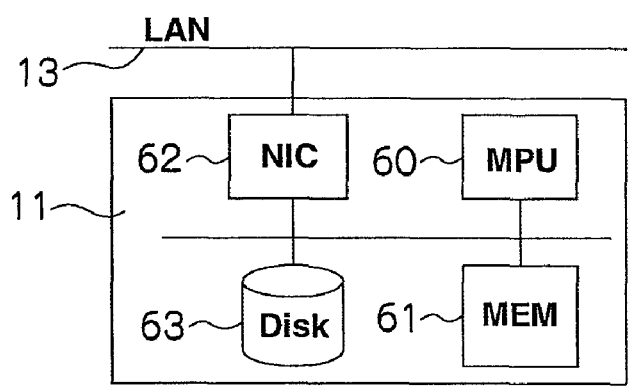
FIG. 3 is a hardware configuration diagram focusing on a first storage device according to the above embodiment.

FIG. 3 is a physical configuration diagram showing the first storage device 11. The first storage device 11 consists of: an MPU 60 that executes processing; a memory 61; a NIC chip 62 for connecting the first storage device 11 to the LAN 13; a program that determines the operation of the first storage device 11; and a disk 63 that stores user content and ads.

Figure 4:
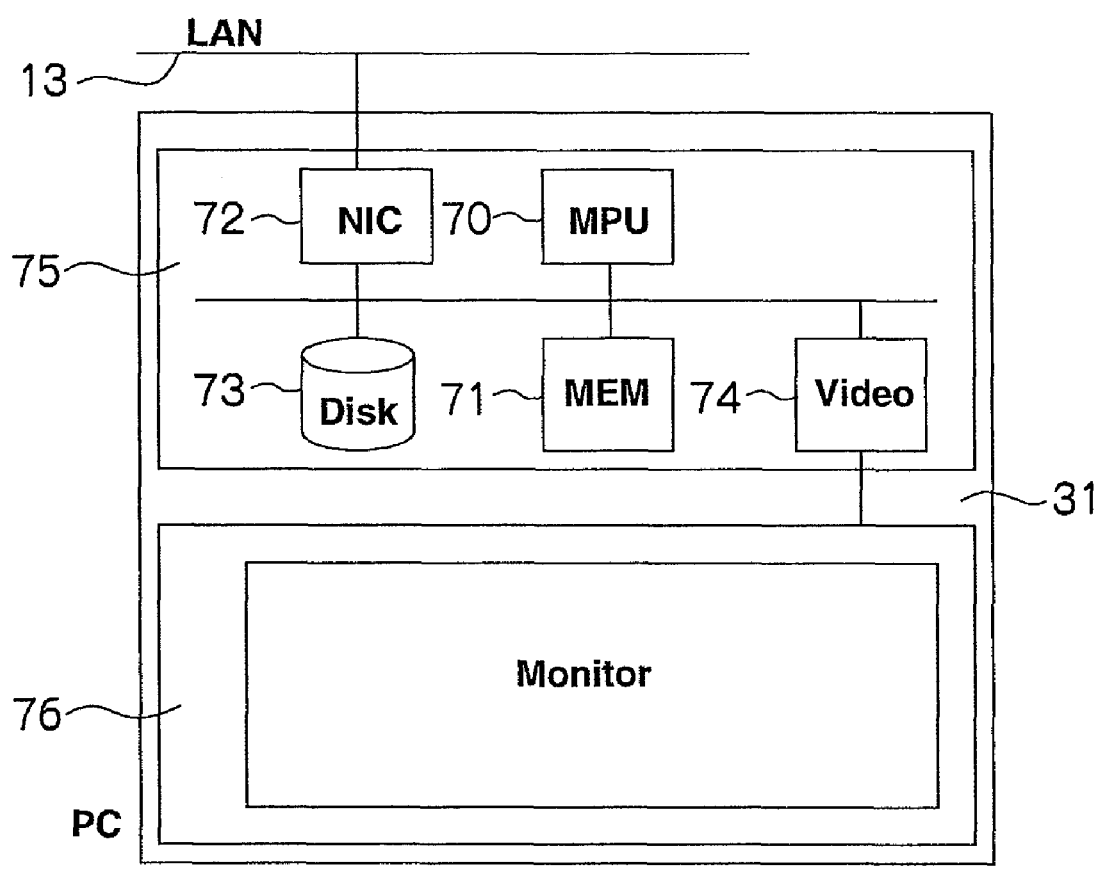
FIG. 4 is a hardware configuration diagram focusing on a PC according to the above embodiment.

FIG. 4 is a physical configuration diagram showing the personal computer 31 used by the sponsor 30. The personal computer 31 consists of a computing unit 75 that performs computation processing and a monitor 76. The computing unit 75 consists of an MPU 70 that performs processing, a memory 71, an NIC chip 72 for connecting the personal computer 31 to the LAN 13, a program for determining the operation of the first storage device 11, a disk 73 that stores user content and ads, and a video card 74 for connecting the computing unit 75 to the monitor 76. The monitor 76 may be an LCD or a plasma display. Although the monitor 76 is a part of the personal computer in this embodiment, the monitor 76 may alternatively be configured in another housing.

Figure 5:
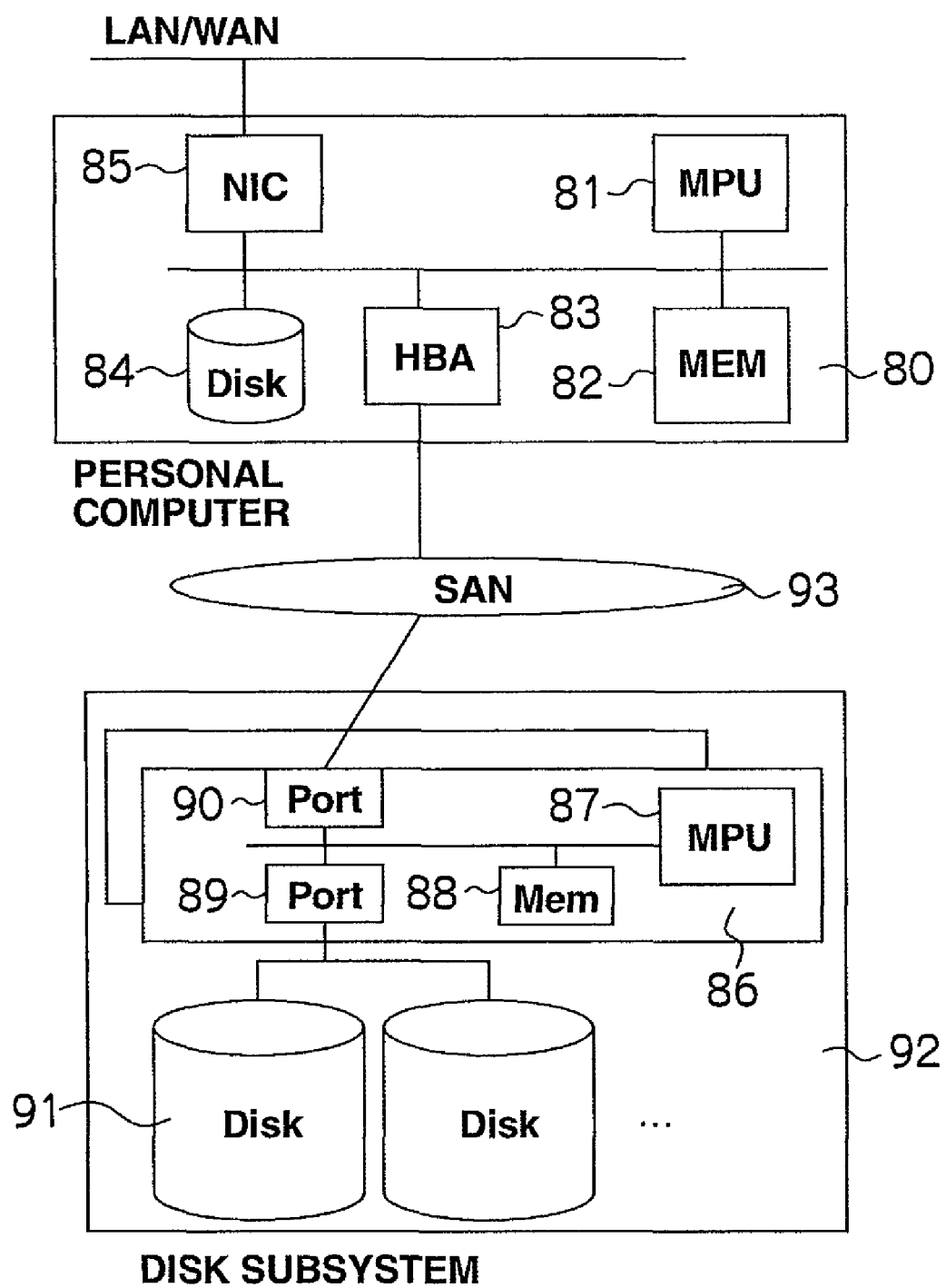
FIG. 5 is a diagram showing the entire configuration of a storage system according to the above embodiment.

FIG. 5 shows the physical configuration of the second storage device 21 in the backup center 20 where backup data is stored. In the first embodiment, the second storage device 21 consists of a personal computer 80 and a disk subsystem 92.

The personal computer 80 includes an MPU 81 that executes processing, a memory 82, an NIC chip 85 for connecting the personal computer 80 to the LAN/NAN, an OS (Operation System), a disk 84 that stores a program for performing backup and ad distribution processing, an HBA (Host Bus Adapter) 83 for connecting the personal computer 80 to the external disk subsystem 92.

The disk subsystem 92 includes a disk array controller 86 and disks 91. The disk array controller 86 includes an MPU 87 that performs RAID (Redundant Arrays of Inexpensive Disks) processing, a port 90 that provides memory resources for the personal computer 80 serving as a host personal computer using a Small Personal computer System Interface (SCSI) command via a Fibre channel, a port 89 that connects the disk 91 and the disk array controller 86 to each other, and a memory (MEM) 88 that stores cache data and program operation information. The plurality of disks 91 transfers data using the disk array controller 86 and a protocol such as a Fibre Channel, SAS (Serial Attached SCSI), a SATA (Serial ATA) or etc. This disks 91 store backup data and interest and favorite information for the first storage device 11 and ad data and interest and favorite information from the sponsor 30. In order to enhance the reliability of data, the disk array controller 86 may use RAID for enhancing the reliability of the disks 91 by RAID 1 or RAID 5.

The personal computer 80 and the disk subsystem 92 are connected to each other via a Storage Area Network (SAN) 93. The SAN is a communication path connecting the storage device and the host computer for transferring data using a protocol such as Fibre Channel, SAS, Enhanced Serial ATA (eSATA) or iSCSI.

Although the configuration having an external storage device has been described in the first embodiment, data may be stored in the disk 82 instead of the disks 91.

Figure 6:
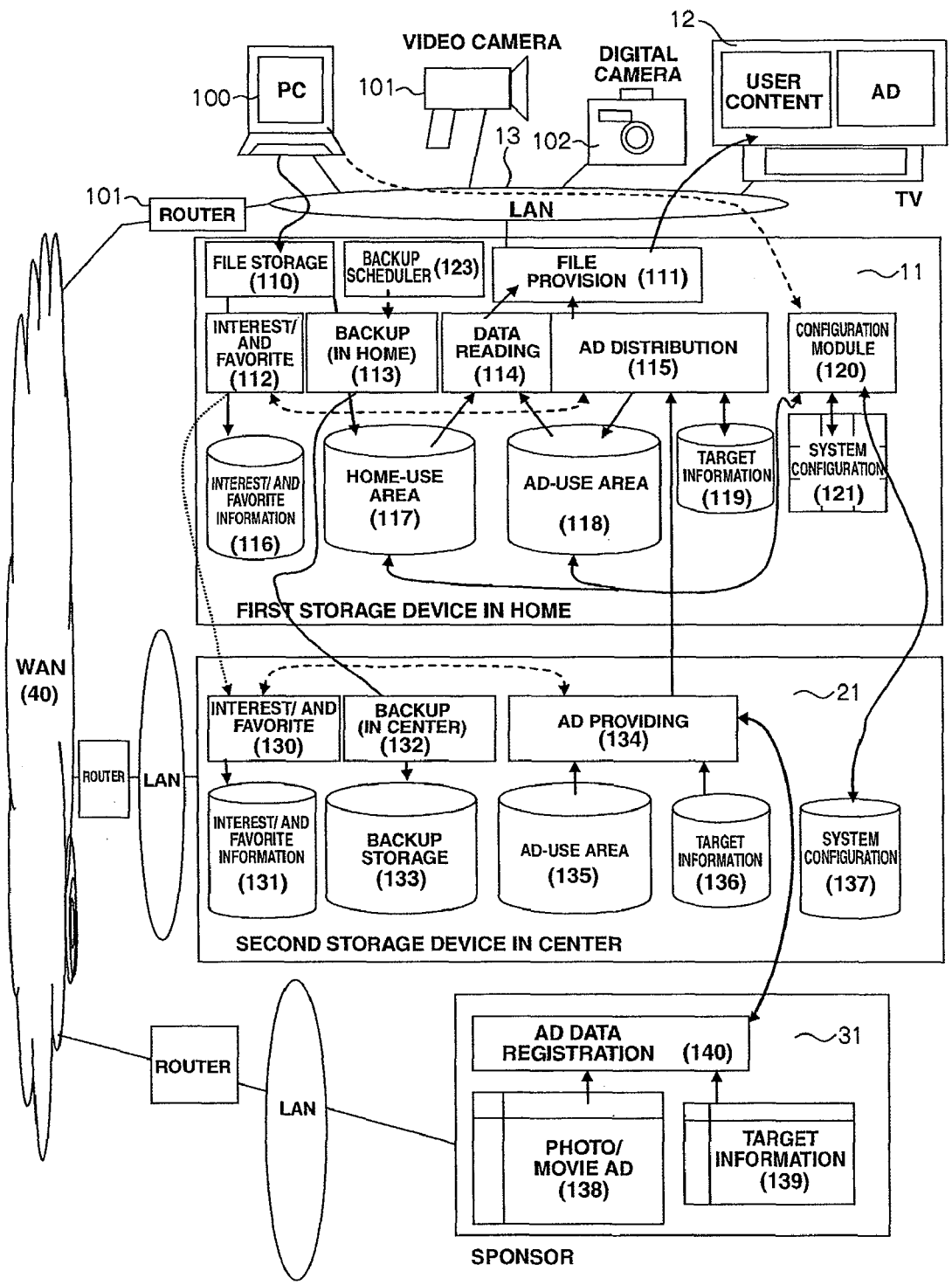
FIG. 6 is a logical configuration diagram showing the entire system according to the above embodiment.

FIG. 6 shows a logical configuration diagram in the first embodiment. Although only a part of the operations will be described in this section, for convenience of explanation, the operations will be described later in detail. Also, the solid line in the configuration diagram shows the migration of data and the dotted line shows the flow of control information.

The LAN 13 is provided in the home 10, and a PC 100, a video camera 101, a digital camera 102 or a television 12 is connected to the LAN 13. The LAN 13 is connected to the external WAN 40 (e.g., the Internet) using a LAN-WAN router 101 such as an ADSL router and a cable modem router. The first storage device 11 is also connected to the LAN 13. The first storage device 11 includes: a file store module 110 that receives data from the video camera 101, the digital camera 102 and the PC 100, which create content, using a file share protocol such as NFS (Network File System), Web DAV (Distributed Authoring and Versioning protocol for the WWW), CIFS (Common Internet File System), or SMB (Server Message Block); and a file providing function 111 that provides stored files via http.

First, before operating the apparatus, system configuration for the first storage device 11 is set using a configuration module 120. The configuration module 120 enables the user to access an http protocol from a web client in the PC, displays a management address (e.g., http://192.168.0.3/manager.html) and a management GUI, and sets a home-use area 117 and an ad-use area 118 in the area of the disk 63 shown in the physical configuration diagram (FIG. 3).

The file store module 110 stores content in the home-use area 117 and at the same time extracts meta information from the content. The meta information is transferred to an interest and favorite unit 112. The interest and favorite unit 112 integrates obtained meta information pieces into a list. Also, if the meta information needs to be normalized, the interest and favorite unit 112 performs normalization of the meta information based on normalization information provided by the backup center 20.

Based on the backup schedule having been set by the device setting module 120 for content stored in the home-use area 117, a backup scheduler 123 gives a command for the execution of backup and a backup unit 114 backs up files in the home-use area 117 in the second storage device 21. During this backup, the content in the home storage 11 and interest and favorite information 116 are transferred to the interest and favorite information unit 130 and to the backup unit 132 in the second storage device 21 and stored in the interest and favorite information unit 131 and the backup storage unit 133. The second storage device 21 is also connected to the WAN via a device such as a router.

The sponsor 30 has prepared in advance a photo/movie ad 138 and target information suitable for the ad and interest and favorite information for each home and registers the ad image/video in an ad data registration unit 140 using the personal computer 31 connected to the WAN 40 via a device such as a router. During the registration, the ad data registration unit 140 stores the photo/movie ad 138 in an ad area 135 and also stores the target information 139 in a target information storage area 136 via an ad provision unit 134.

The ad provision unit 134 determines which ad is to be distributed based on plural pieces of interest and favorite information provided by the first storage devices 11 and distributes that ad to the first storage device 11.

An ad distribution unit 115 in the first storage device 11 receives the ad image/video distributed from the second storage device 21, also receives the ad image/video target information distributed together with the ad image/video and stores it in a target information storage area 119.

When the file provision unit 111 in the first storage device 11 receives a content reproduction request from a content player that can reproduce content (e.g., the PC 100 and the television 12), the ad distribution unit 115 obtains interest and favorite information for the corresponding file from the interest and favorite unit 112 based on the file name, refers to the ad list stored in the target information storage area 119 for the ad relating to the obtained interest and favorite information, selects an ad suitable for the relevant content and distributes the selected ad when the file provision unit 111 distributes the relevant content.

Figure 7:
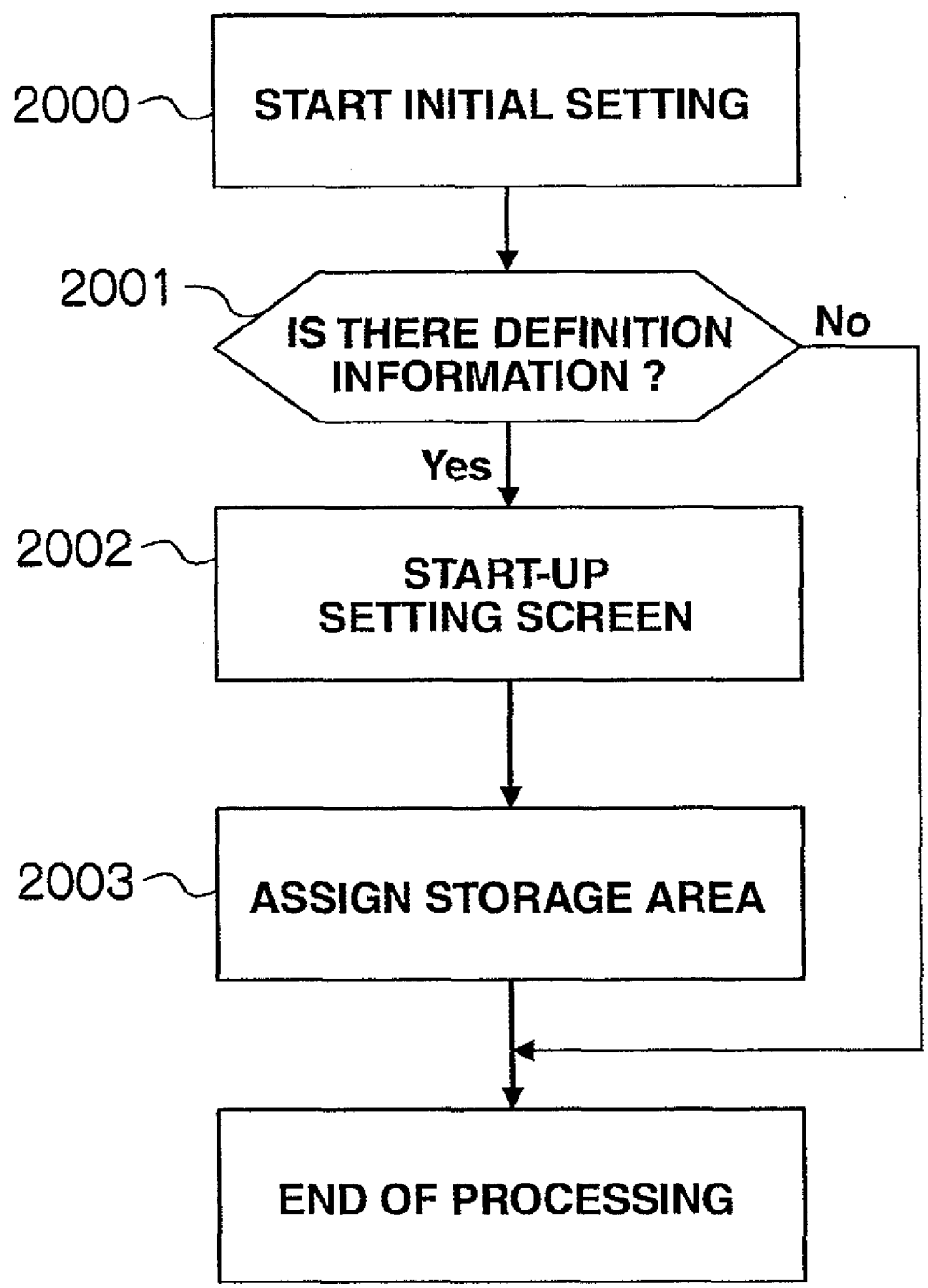
FIG. 7 is a flowchart showing an initial setting for the first storage device according to the above embodiment.

An operation method using a logical configuration for performing the above operation will be described. FIG. 7 shows a setting flow showing how the configuration module 120 configures setting when the first storage device 11 is installed in the home 10. Specific operation steps will be described below.

Step 2000: A start-up setting screen is presented when the power for the first storage device 11 is turned on. This screen is presented by the configuration module 120 when an access is made to the first storage device 11 via the http protocol. Step 2001: The configuration module 120 checks whether or not settings have already been configured based on already-set items in the system configuration information 121. In the first embodiment, whether or not user definition information has an already configured bit (2080) (see FIG. 11) in the system configuration information 121 is checked. If the already configured bit is off, step 2002 should be performed for configuring the setting. On the other hand, when this bit is on, re-setting does not have to be performed when starting the first storage device 11, so the current operation is terminated. Step 2002: The configuration module 120 presents the start-up setting screen and displays it on an http browser so that the user can input the percentage of the ad area. Step 2003: The configuration module 120 receives the ad area percentage determined in step 2002 and sets the received value, and the setting processing is terminated.

Figure 8:
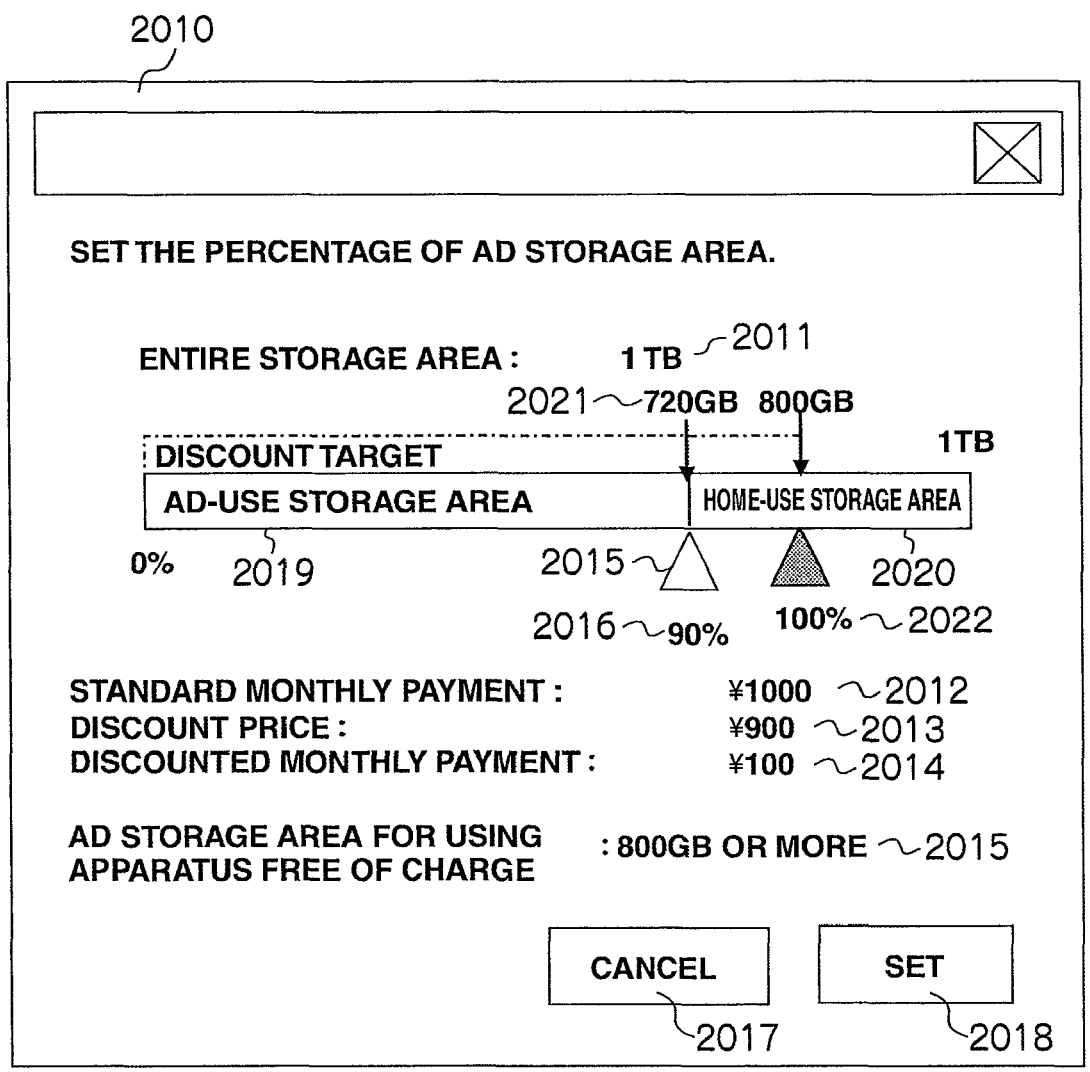
FIG. 8 shows a GUI diagram for determining an ad-use storage area and a home-use storage area in the first storage device according to the above embodiment.

The start-up setting screen in step 2002 will be described in more detail. FIG. 8 shows this setting screen 2010. When the PC 100 or the television 12 is connected to the configuration module 120 via the network using a web browser typified by Internet explorer provided by Microsoft (registered trademark) Corporation or FireFox provided by Mozilla Foundation, the configuration module 120 creates html and displays the setting screen 2010.

The setting screen 2010 shows the entire storage area capacity 20111 that is available to the user and a slide bar 2015 for variably setting the capacities for an ad-use storage area 2019 and a home-use storage area (the user's available storage area) 2020 so that the user can set the ad-use area 118 in the first storage device 11. The user sets the percentage of the ad storage area 2019 using the slide bar 2015 and the set percentage is shown in 2016 in relation to the entire storage area 2011 and the capacity of the ad storage area at this time is shown in 2021 in the setting screen 2010. The maximum value of the percentage, i.e., a threshold value for charge-free use of the first storage device 11, is shown by the ad storage area capacity (2015) when the first storage device 11 can be used without charge, and it becomes the maximum (100%) when the slide bar 2015 reaches its upper limit 2022. Free ad storage capacity field 2057 in the system setting information (to be described later) (see FIGS. 10A to 10C) is referred to for the ad storage area capacity where the first storage device 11 is used without charge. The entire storage area capacity 2045 in the system setting information in system configuration information (to be described later) is referred to for the entire save area 2011.

The usage charge for the first storage device 11 based on the set capacity is displayed as discounted monthly usage charge 2014, and at the same time, discount price 2013, which has been determined based on a pre-discount standard monthly payment 2012 and the percentage of the ad storage area, and the ad storage area capacity 2021 with which the usage charge for the first storage device 11 becomes without charge are displayed.

The amount (2052) of the standard basic charge in the system setting information (to be described later) (see FIGS. 10A to 10C) is referred to for standard monthly payment 2012 to be displayed. The value obtained by subtracting from this amount the discount price 2013 obtained based on the percentage of the ad storage area is the discounted monthly usage charge 2014. In the first embodiment, the discount price is determined using the percentage of the ad storage area 2019 as a discount percentage, but the discount price may be determined by another method.

When the user clicks on a setting button 2018 after inputting the percentage of the ad storage area, the setting processing operation in step 2003 is performed. When the user clicks on a cancel button 2017, the current percentage of the ad storage area is reset and default factory percentage setting, e.g., 40% ad storage area, is displayed. In order to simplify the user interface, the percentage may be fixed to the default percentage as of the factory shipment or the percentage may be acquired from the center by accessing the center after being connected to the network during the initial setting. In such cases, the usage charge is also fixed on factory shipping.

The setting of an IP address for the first storage device 11 is performed using the standard of Zero Configuration Networking ((http://www.zeroconf.org/), http://files.zeroconf.org/draft-ietf-zeroconf-reqts-12.txt) provided by IETF, and the resulting IP address is set to an IP address 2081 and a host name 2082. Alternatively, a GUI (Graphical User Interface) may be prepared in step 2002 so that users can set the IP address by themselves.

Figure 9:
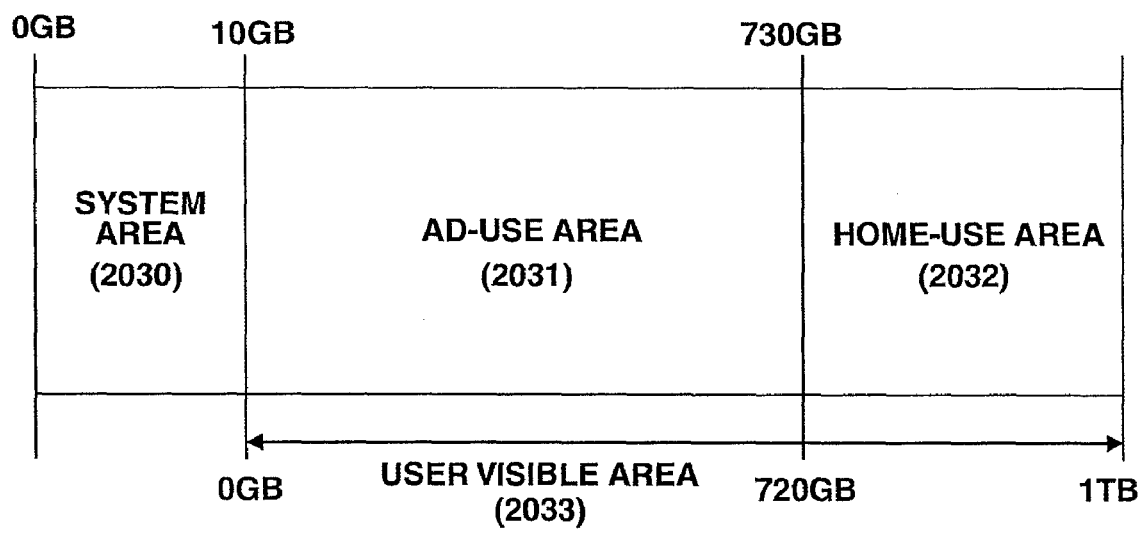
FIG. 9 is an area configuration diagram showing a disk in the first storage device according to the above embodiment.

FIG. 9 is a diagram that conceptually shows the storage area during the storage area setting in step 2002. The disk 63 in FIG. 3 includes a system area 2030, an ad-use area 2031 and a home-use area 2032. In this storage space, a visible space for the user is a user visible area 2033, and the system area 2030 may be configured to be inaccessible from the user in consideration of accidental loss of files caused by user's operation error. Operation programs and setting information for the first storage device 11 are saved in the system area 2030.

Next, items set in step 2003 will be described. FIGS. 10A to 10C show system setting information stored in the system area. A serial number 2056 is the identifier of the first storage device 11, and this number is a unique number assigned to each first storage device before shipment. The setting information includes system configuration 2040 in the disk 63, a standard basic charge 2050 and a charge-free ad storage capacity 2055. The system configuration 2040 includes, in order to show the space of an area (area name) 2041, an area start position 2042 and an area size 2043. The setting information also includes the entire storage area 2045 managed by the first storage device 11. Although the start position 2042 and the size 2043 are specified by capacities "GB" in this embodiment, they may be specified by addresses such as Logical Block Addresses (LBA). The set capacity may be clearly divided into areas by fdisk or divided into areas by Quata in the file system.

The standard basic charge is shown in 2050. Although a fixed value is shown for the standard basic charge 2050 in the first embodiment, the standard basic charge 2050 may be varied based on a standard basic charge provided by the backup center 20. The charge-free ad storage capacity is shown in 2055. The charge-free ad storage capacity 2055 may be varied based on a capacity provided by the backup center 20 like the standard backup charge 2050.

FIGS. 11A to 11D show the user setting information stored in the system area. This user setting information includes home-use area system configuration 2060 in the disk 63, a user charge 2070 and an ad area percentage 2075.

The home-use area system configuration 2060 includes, in order to show the space of each area (area name) 2061, an area start position 2062 and an area size 2063. The areas set in step 2003 are the ad storage area 2064 and the home-use storage area 2066, and the start position 2062 and the size 2063 based on the percentage determined by the GUI is assigned to each of the above areas. Also, the percentage set in step 2003 is stored in 2075 by the configuration module 120.

When shipped out from a factory, the first storage device 11 is in a state where a file system has already been configured for the user visible area 2033 and a large number of ad files and target information pieces provided by the backup center 20 have been stored, and the home-use area 117 is prepared by deleting unnecessary files in the target information pieces sequentially from low-order files in a ad list in which ads are listed from high referred keyword and from low-order files in a wildcard ad list in which ads that do not contain high referred keywords but are listed in an order based on advertising rates set by the sponsor, based on the value set in step 2003. This procedure provides advantages in which the user can promptly use the ads without the need for receiving the distribution of new ads from the backup center 20.

In another preparation procedure, the user visible are 2033 may be set as a format and the initial-state home-use area 117 and ad area 118 may be prepared. This procedure provides an advantage in which the first storage device 11 can be used after acquiring the latest ad information in backup operation (to be described later). In order to be connected to the second storage device in the center, the first storage device stores the IP address or server name of the second storage device to identify the secondary storage device, the IP address or server name being set by the user or set when shipped out from its factory.

After preparing the home-use area 117, the file storage unit 110 assigns a public name (e.g., ¥¥homestorage¥user) using a file sharing protocol such as NFS, CIFS, SMB, or WebDAV to a file system in the home-use area 117 and publicizes the file system with the public name. When publicizing the file system, files, their names and their attributes are made referable and changeable and write accesses to the files are permitted while denying read accesses, so that the files are prevented from being read by the user without charge. Each PC 100 accesses to the first storage device 11 using this public name. Note that the public name may be set as a default value when shipped out from the factory or may be set later by the user via the configuration module.

Figure 12:
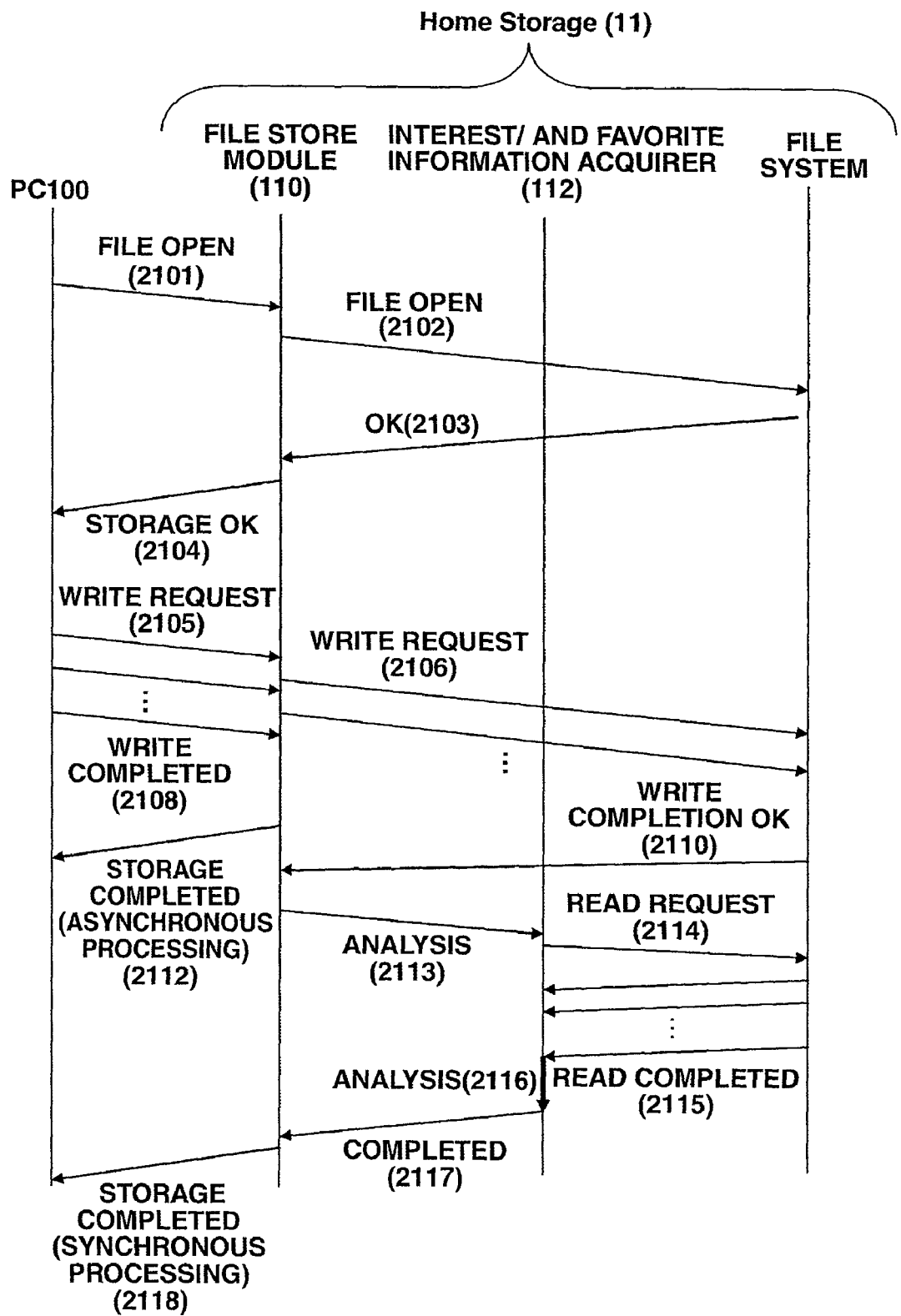
FIG. 12 shows a file storage sequence for the first storage device and a file storage device (PC, digital camera, video camera, etc.) according to the above embodiment.

Next, the operation for storing data in the first storage device 11 will be described. FIG. 12 is a sequence diagram showing file storage operations. The user using the PC 100 selects a file to be stored in the first storage device 11 and moves the data to a folder having the public name publicized by the first storage device 11. The PC 100 checks with the file storage unit 110 about the state of the file in the first storage device 11 that has the same name as that of the selected file (e.g., whether the corresponding file can be created and whether the corresponding file can be overwritten).

Since the actual file is stored in the file system, the processing 2101 is further performed as a system call in the file system (2102). If the corresponding file can be created or overwritten, the first storage device 11 provides a response (OK) reporting that the file has been stored (2103). The PC 100 receives this response (2104) and reads the data of the selected file and starts transferring the data (2105).

When the transfer of the entire data is completed, the PC 100 gives a report for reporting the completion of the transfer (2108). The file storage unit 110 opens the relevant file in the file system in order to store the received data in the file system (2106). When completing writing, the PC 100 transmits a report indicating the completion of the data write (2110). When asynchronous processing is employed, even when another write request 2106 follows the completion of the above write processing 2108, the completion of file storage is reported in 2112. On the other hand, if synchronous processing is employed, the write processing is continued. After receiving the write completion report in 2110, the file storage unit 110 makes a request to the interest and favorite information acquirer 112 to analyze the stored file. The interest and favorite information acquirer 112 reads the relevant file from the file system (from read request 2114 to read completion report 2115) and analysis processing 2116 is performed for the read data. After the completion of the analysis processing, the interest and favorite information acquirer 112 transmits a completion report 2117 to report the completion of storage (2118).

Figure 13:
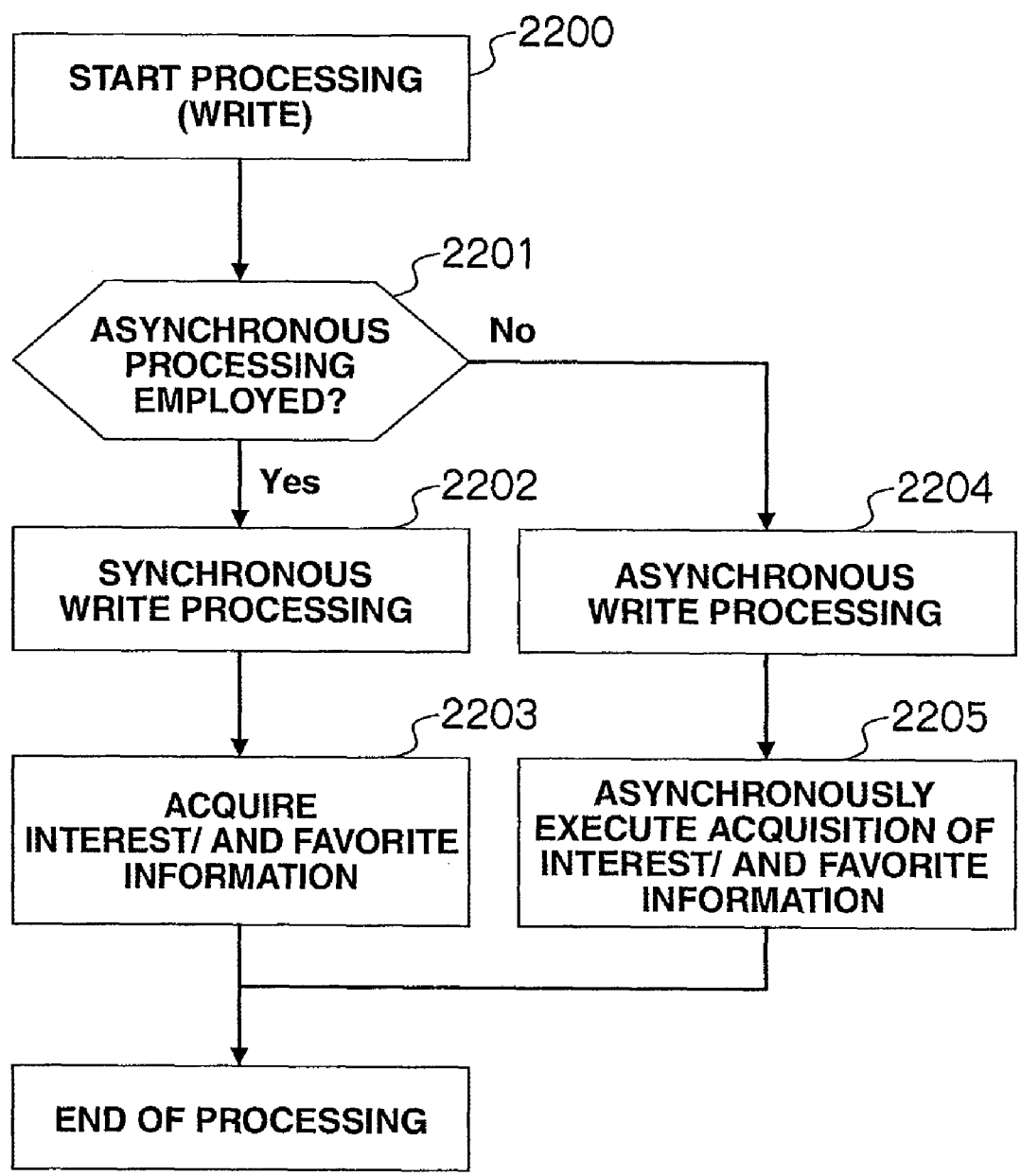
FIG. 13 is a flowchart showing synchronous/asynchronous write processing in the first storage device according to the above embodiment.

During the file open processing 2101, a value indicating synchronous processing or asynchronous processing is selected. Since operations change depending on this value, a flowchart for write processing will be shown. FIG. 13 is a flowchart showing write processing performed by the file storage unit.

Step 2201: When performing write processing, the file storage unit refers to an option transmitted during the file open processing to check which processing is selected, synchronous processing or asynchronous processing. The processing proceeds to step 2202 when synchronous processing is selected and proceeds to step 2204 when asynchronous processing is selected. Step 2202: Synchronous write processing is performed. This processing is the same as the above described processing from 2106 to 2110. Step 2203: The file storage unit acquires the interest and favorite information. This processing is the same as the above-described processing from 2113 to 2117.

Step 2204: Asynchronous write processing is performed. In this processing, the above-described processing from 2106 to 2110 is performed as background processing after the processing 2105. At this time, in order to ensure data integrity, the file group to be analyzed is locked. This processing is the same as the above-described processing from 2113 to 2117. When the processing 2116 is completed, the above file group is unlocked so that the file group can be accessed in other processing.

This is how the write processing is performed. The selection of synchronous processing or asynchronous processing may not be available for some protocols, so synchronous processing is employed unless otherwise designated.

Figure 14:
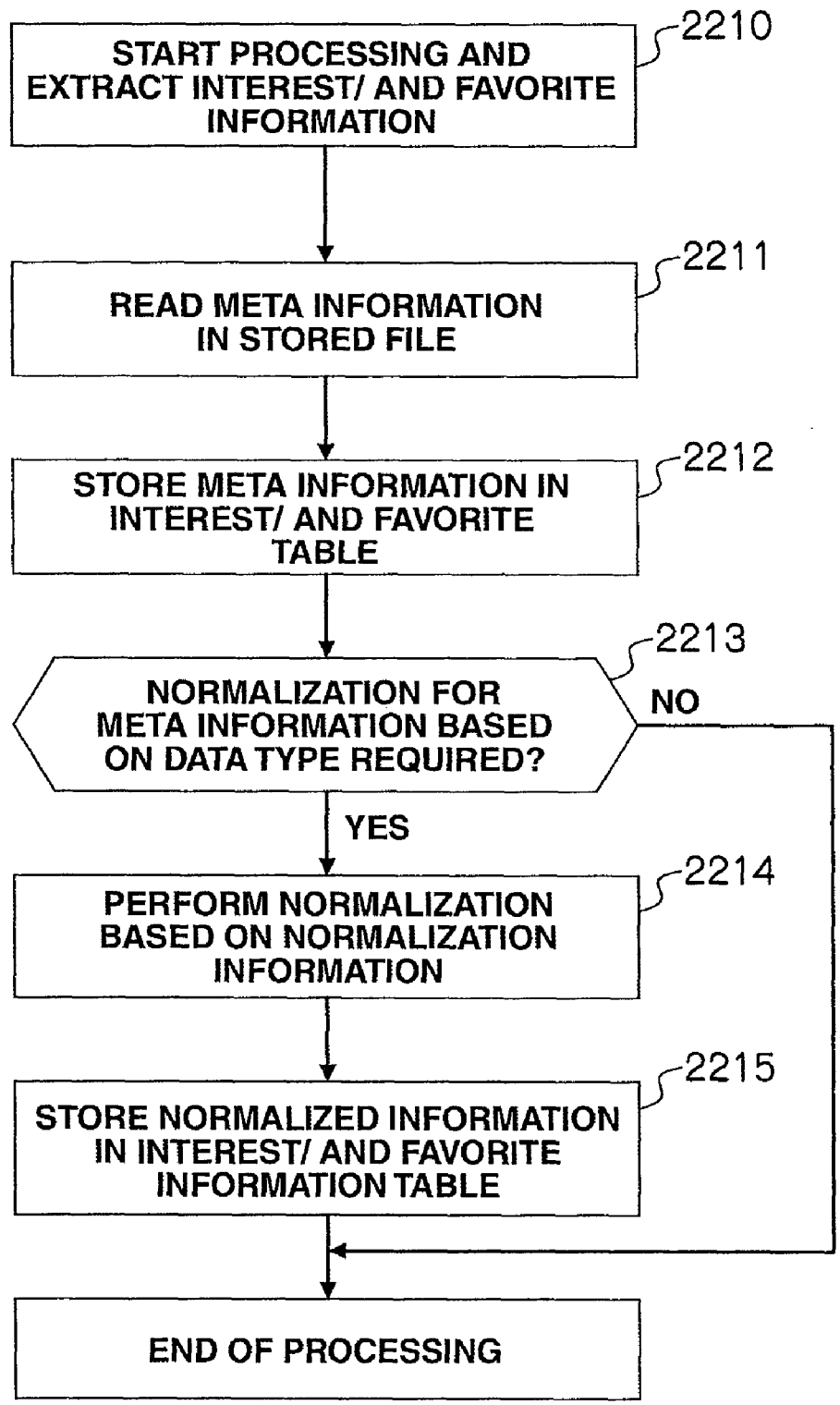
FIG. 14 is a flowchart showing the extraction of interest and favorite information performed in the first storage device according to the above embodiment.

The acquisition of the interest and favorite information performed by the interest and favorite unit 112 shown in steps 2203 and 2205 is shown in step 2210 in FIG. 14. FIG. 14 is a flowchart showing interest and favorite information acquisition processing.

Step 2211: Meta information in the stored file is read. This processing is performed as per steps 2114 and 2115 in the sequence diagram. Step 2212: The meta information is stored in an interest and favorite table 2220 (see FIG. 15) in the interest and favorite information unit 116. Step 2213: A data type table 2240 (see FIG. 16) is referred to check whether or not the data type of the stored file has been already registered as a data type 2241.

If it has been already registered, the processing of step 2213 is performed. On the other hand, if it has not been registered, the processing proceeds to step 2215. Step 2214: Normalization is performed based on normalization information for the relevant data type 2241. For example, for JPG data whose normalization method is "normalization based on region," usage information 2243 is referred to and the normalization based on region is performed for a "GPS tag". Taking the file with the file name "HIT00001.JPG" in FIG. 15 as an example, the prefecture (e.g., Hiroshima) where the photography took place is identified using tag information in the GPS. In another example, sound in a video picture is converted into plain text, a high referred keyword is extracted from the plain text and the extracted keyword (e.g., child) is registered. Step 2215: With the normalized information treated as a summary for the relevant tag in the interest and favorite table 2220, a normalization method 2230 and a value 2231 are additionally registered. This is the end of extraction processing for the interest and favorite information.

FIG. 15 shows the interest and favorite table 2220 in which meta information described in step 2212 is recorded. The interest and favorite table 2220 has a serial number 2232 that serves as an identifier for the first storage device 11. This number is a number uniquely assigned to the first storage device 11 when shipped out from the factory. The interest and favorite table 2220 table also has a user name 2233 that indicates who the transmitted interest and favorite information belongs to. The user name may be an individual user name that is registered when the initial settings for the first storage device 11 are configured, or a user name for all the users designated when the first storage device 11 is shipped out. The meta information of a file is table 2220. The meta information of a file is extracted and the file name 2221, date of creation of the file 2222, time of creation 2223, date of change (not described in the specification), time (not described in the specification) and the data type 2224 are registered as basic information. If the file has metadata for each file type, the metadata is also registered as a tag 2225, and its forms 2226 and 2228 and its values 2227 and 2229 are registered. When the normalization processing in step 2214 is performed, the normalization method 2230 and its value 2231 are registered as a summary.

FIG. 16 shows the data type table 2240 used for determining the data type in step 2213.

The data type table 2240 includes a data type 2241 showing the type of each data, normalization processing 2242 showing the method for the normalization processing, usage information 2243 used when the normalization is performed, a storage tag 2244 showing a tag that is stored as a summary when the normalization is performed. The data type table 2240 is provided when shipped out from the factory. Or, the second storage device 21 transmits a new data type table 2240 when it updates target information (to be described later), and that information is updated by the ad provision unit 134.

Next, backup processing performed by the backup unit 113 will be described. The backup processing is periodically performed for stored data.

FIG. 17 is a table 2250 showing a backup policy for backup. The backup policy table includes a policy 2251, a schedule 2252 for implementing the policy, a backup execution time 2253 and a backup method 2254. For example, if the policy 2251 is "every day," the schedule 2252 for performing backup is every day, the execution time 2253 is 0:00 am at midnight and the backup method 2253 is differential backup. "Every day" and "every month" have been set for the policy 2251 as factory default, and differential backup is performed everyday and full backup is performed every month. These factory default values may be changed using the GUI in FIG. 18 in accordance with a user request.

Figure 18:
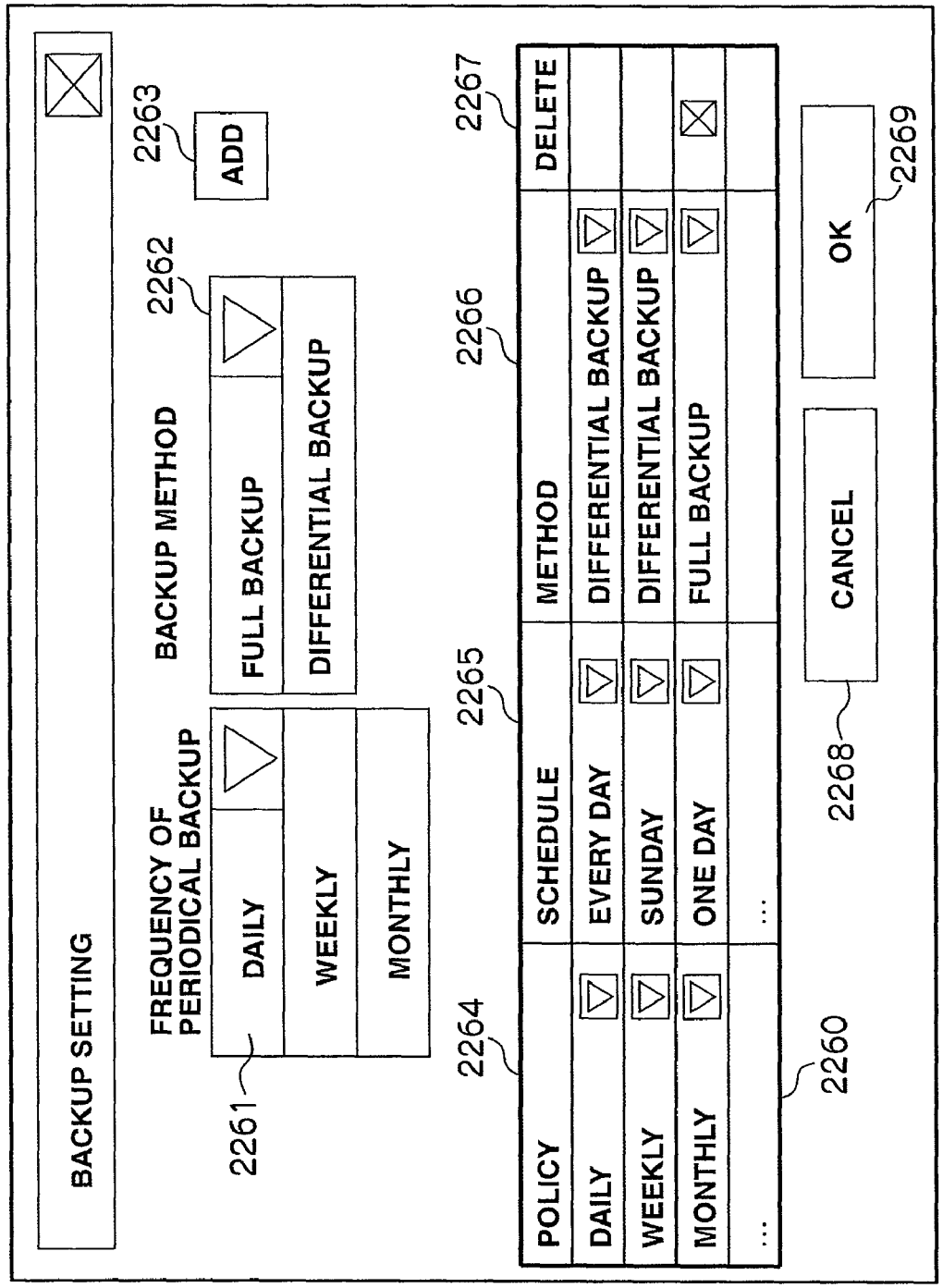
FIG. 18 shows a GUI for backup setting performed by the first storage device according to the above embodiment.

FIG. 18 is the GUI used for changing the above factory default values in accordance with a user request. The user selects a periodical backup frequency (every day, every week or every month) 2261 and a backup method (full backup, incremental, or differential backup) 2262 and clicks on an "add" button 2263 in order to add a policy name 2264, a schedule 2265 and a method 2266 in the table 2260.

When a policy is deleted according to a user request, a "delete" checkbox 2267 is turned on. By clicking an "OK" button 2269, the backup unit 113 adds or deletes a policy entry (schedule, method and time) in the backup policy table 2250. When a "cancel button" is clicked, the setting is canceled.

Figure 19:
FIG. 19 is a table showing the schedule of daily backup performed by the first storage device according to the above embodiment.

FIG. 19 shows a daily backup schedule table 2270 that the backup unit 113 generates at a certain time (e.g., 4:00 am) every day based on the generated backup policy.

This backup schedule table 2270 includes time 2271 for executing backup and a backup method 2272 for the to-be-executed backup. The backup scheduler 123 executes the backup based on this schedule.

Figure 20:
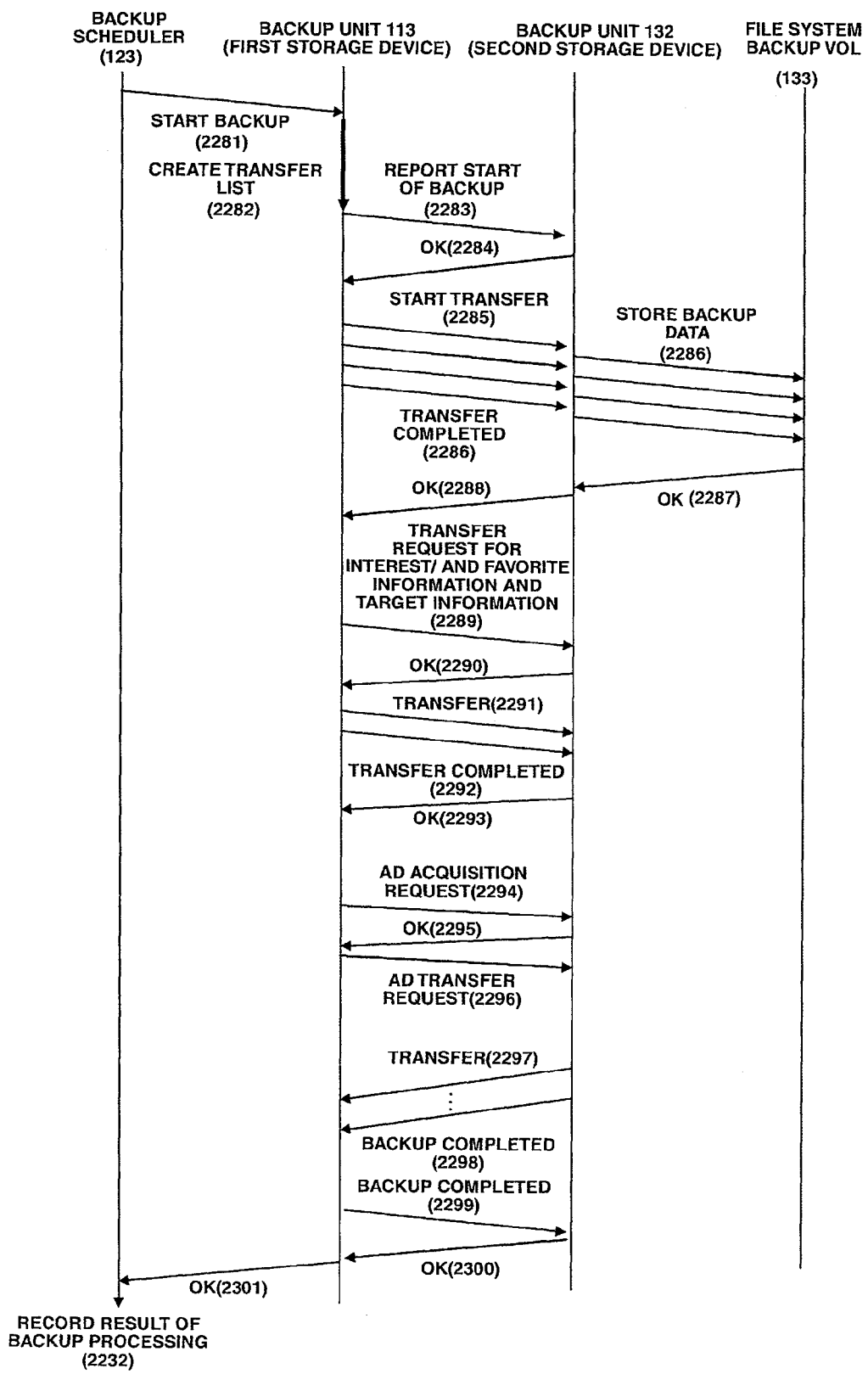
FIG. 20 is a sequence diagram showing backup processing performed by the first storage device and a second storage device according to the above embodiment.

FIG. 20 shows a sequence diagram for backup to be executed. The sequence will be described in detail below.

Step 2281: The backup scheduler 123 requests the backup unit 113 to start backup. Step 2282: The backup unit 113 creates a transfer list for files to be backed up. For a full backup, this list is created with all the backup data. For a differential backup, files that have been updated after the last backup are extracted based on the update date 2222 and time 2223 and this list is created with the extracted file.

Step 2283: The backup unit 113 in the first storage device 11 reports a required capacity to the backup unit 132 in the second storage device 21 and also reports that the backup processing will be executed. Step 2284: The backup unit 132 in the second storage device 21 checks with a backup storage unit 133 whether there is enough capacity for the required capacity. If there is enough capacity, the backup unit 132 provides a permission report to the backup unit 113 in the first storage device 113. On the other hand, if there is not enough capacity, the backup unit 132 provides an error report to the backup unit 113 in the first storage device 11. The backup unit 113 in the first storage device 11 provides the error report to the backup scheduler 123.

Step 2285: The backup unit 113 in the first storage device 11 transfers files based on the transfer list. Step 2286: The backup unit 132 in the second storage device 21 stores the data received from the backup unit 113 in the file system in the backup storage unit 133. Step 2287: When the storage of the backup data is completed, the file system in the backup storage unit 133 provides a storage completion report to the backup unit 132. Step 2288: The backup unit 132 reports to the backup unit 113 that the data has been stored in the file system.

If asynchronous backup processing is selected, the following steps will be taken. Step 2289: The backup unit 113 in the first storage device 11 reports that the transfer of interest and favorite information and target information is to be started together with a required capacity. Step 2290: The backup unit 132 in the second storage device 21 provides, if the remaining capacity is large enough to allow the transfer, a report (OK) indicating that the transfer is possible to the backup unit 113 in the first storage device 11.

Step 2291: The backup unit 113 in the first storage device 11 transfers the interest and favorite information shown in FIG. 15 and target information 3000 (to be described later) to the backup init 132. The backup unit 132 stores the received information in the file system for storing interest and favorite information. Step 2292: The backup unit 113 in the first storage device 11 provides a transfer completion report to the second storage device 21. Step 2293: The backup unit 132 in the second storage device 21 reports to the personal computer 31 that the transfer has been completed. Step 2294: The backup unit 113 in the first storage device 11 issues an ad acquisition request to the backup unit 132 in the second storage device 21 in order to acquire an ad and its target information.

Step 2295: The backup unit 132 in the second storage device 21 reports to the backup unit 113 in the first storage device 11 a capacity required for storing the ad file stored in the ad-use area 118 and the target information stored in the target information storage unit 136. Step 2296: The backup unit 113 in the first storage device 11 issues to the backup unit 132 in the second storage device 21 an ad transfer request for the ad and the target information. Step 2297: The backup unit 132 in the second storage device 21 starts transferring the ad file and the target information. Step 2298: When the transfer of all the files is completed, the backup unit 132 in the second storage device 21 provides a transfer completion report to the backup unit 113 in the first storage device 11. Step 2299: The backup unit 113 in the first storage device 11 reports to the backup unit 132 in the second storage device 21 that the backup processing, which has been started in step 2283, is terminated.

Step 2230: the backup unit 132 in the second storage device 21 provides a response (OK) responding to the completion of the backup processing. Step 2231: The backup unit 113 in the first storage device 11 provides to the backup scheduler 123 an OK response indicating that the backup processing is completed. Step 2232: The backup scheduler 123 records the result of the backup processing as being successful. If an error occurs due to an insufficient capacity or data transfer failure during the above steps, the backup scheduler 123 records the error result in a log in the backup server.

FIG. 21 shows a format in which the interest and favorite information transferred in step 2291 is registered in the backup center 20. In order to manage plural first storage devices 11, a serial number 2311 and a user name 2312 are added to the top of information for each file. Since the format of the interest and favorite information for each file is the same as that in FIG. 15, its detailed description will be omitted here.

The interest and favorite information pieces registered in the backup center 20 are compiled into statistical information 2320 by the interest and favorite unit 130 every time backup is completed. FIGS. 22A to 22C are diagrams explaining statistical data, etc.

The reference numeral 2320 in FIG. 22A shows the compiled statistical data. In this example, what percentage each keyword normalized using a summary tag occupies in the entire file is shown as a percentage 2322 and an order based on this percentage is shown. The interest and favorite unit 130 sets ad charge for each ad based on this order. This charge may be set using an external console via the device setting module 120, or may automatically be set by the second storage device 21 using the percentage. Charge information determined in this charge setting is described in a field 2323. In this example, the charge per second is 1 yen for 1%.

First, before associating an ad with a keyword, the photo/movie ad 138 shown in FIG. 6 is transferred to the ad provision unit 134 in the backup center 20. This transfer uses a protocol suitable for a wide area network such as WebDAV, fts or http. After this transfer, the ad provision unit 134 stores the received photo/movie ad 138 as a list 2340 shown in FIG. 23. FIG. 23 shows an ad list which includes an index 2341, the index being a unique number assigned to each registered file by the ad provision unit 134, a registered user 2342 and a file name 2343 for the registered ad.

Next, target information 139 used as an ad is input for each ad file. The target information 139 corresponding to each index is input as a target information keyword 2344 in FIG. 23. For an ad file for which target information has not been defined, an asterisk mark may optionally be prepared, so the asterisk mark can be selected when there is no target information to be input as a keyword.

Next, registered ad data and the statistical data are matched with each other. This processing is performed by the ad provision unit 134. In FIGS. 22A and 22B, the ad provision unit 134 performs data matching between the keywords 2321 in the statistical data 2320 and the registered target information 2332 and selects an ad.

The sponsor 30 checks the result of the matching between the statistical data and the registered ad data, and the result may be changed as needed. Note that the arrows in the figure show the result.

The sponsor 30 sets the number of simultaneously-browsing-users 2342, a one-time display time 2341 and the total charge 2343 that is obtained from the display time and the number of users, for the index of an ad file for which the correlation between the statistical data and the registered ad data has been verified.

Figure 24:
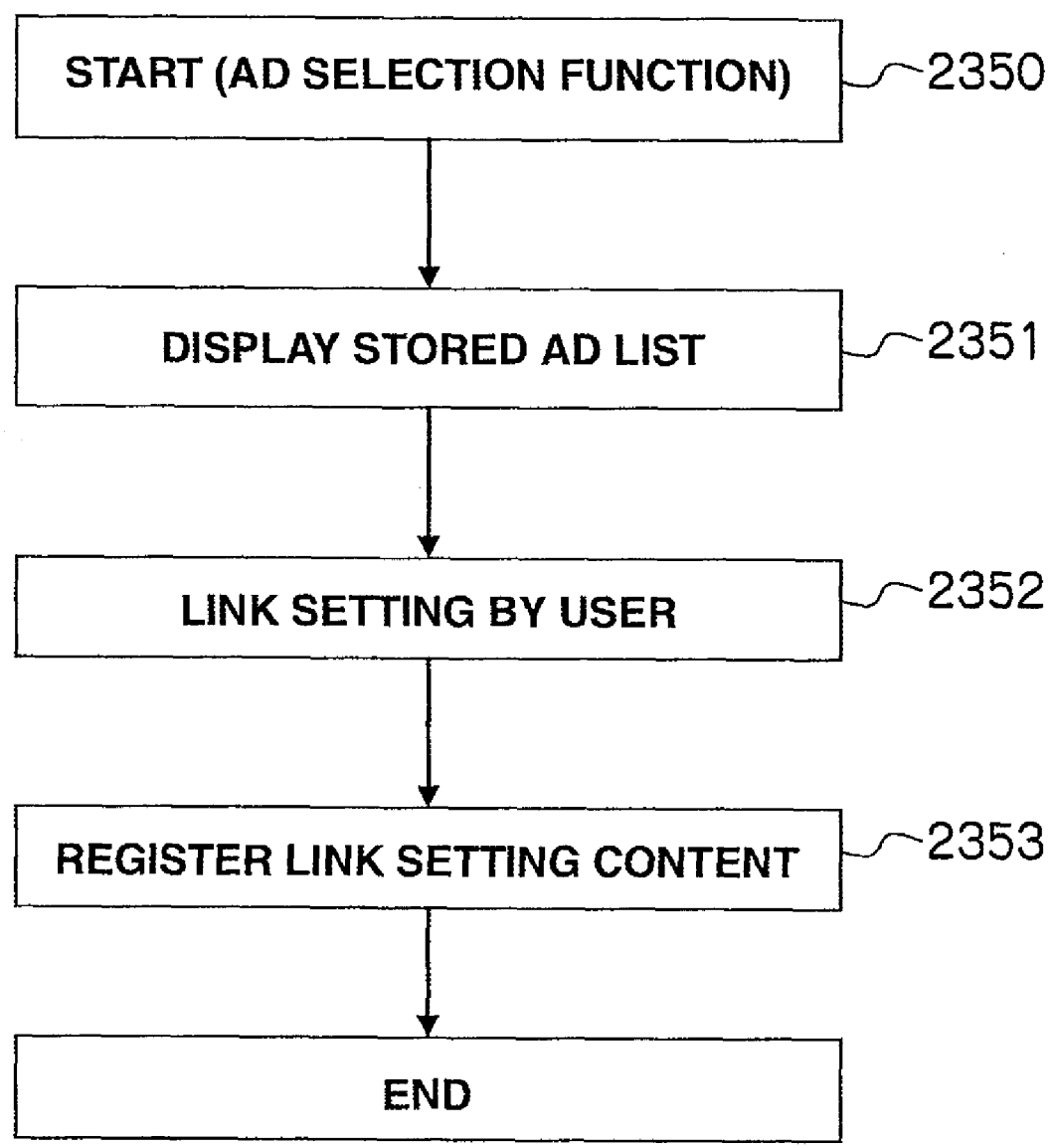
FIG. 24 is a flowchart showing link setting registered by the second storage device for each ad file according to the above embodiment.

The ad provision unit 134 performs the registration, matching and charge setting for the ad as described above. In addition, link information may be added to the registered ad. A flowchart in such a case is shown in FIG. 24.

Step 2351: A stored ad list 2330 is acquired from the ad provision unit 134 and displayed as a GUI. FIG. 25 shows an example of this GUI. In the GUI, information in the stored ad list 2330 is displayed for the index, the target and the ad time, while an online content URL 2363 will be input and online content 2364 will be uploaded. Step 2352: The user configures offline/online link setting. Using the GUI in FIG. 25, the user inputs the online content URL 2363 and uploads the online content 2364. If offline content has not been registered for a certain index, the user can select a file in the personal computer 31 of the sponsor 30 by clicking on an upload button 2367. A photo/movie ad 138 file is selected, this file is transferred to the ad provision unit 134. This transfer uses a protocol suitable for a wide area network such as a put for WebDAV, ftp or http.

When the setting is completed, the sponsor 30 clicks on the OK button 2366 and applies the setting. Step 2353: The link setting content registered in step 2352 is registered as an added portion of the stored ad list 2330. FIG. 26 shows a table including the added portion. The added content includes an offline content URL 2375 and an online content index 2376.

Figure 27:
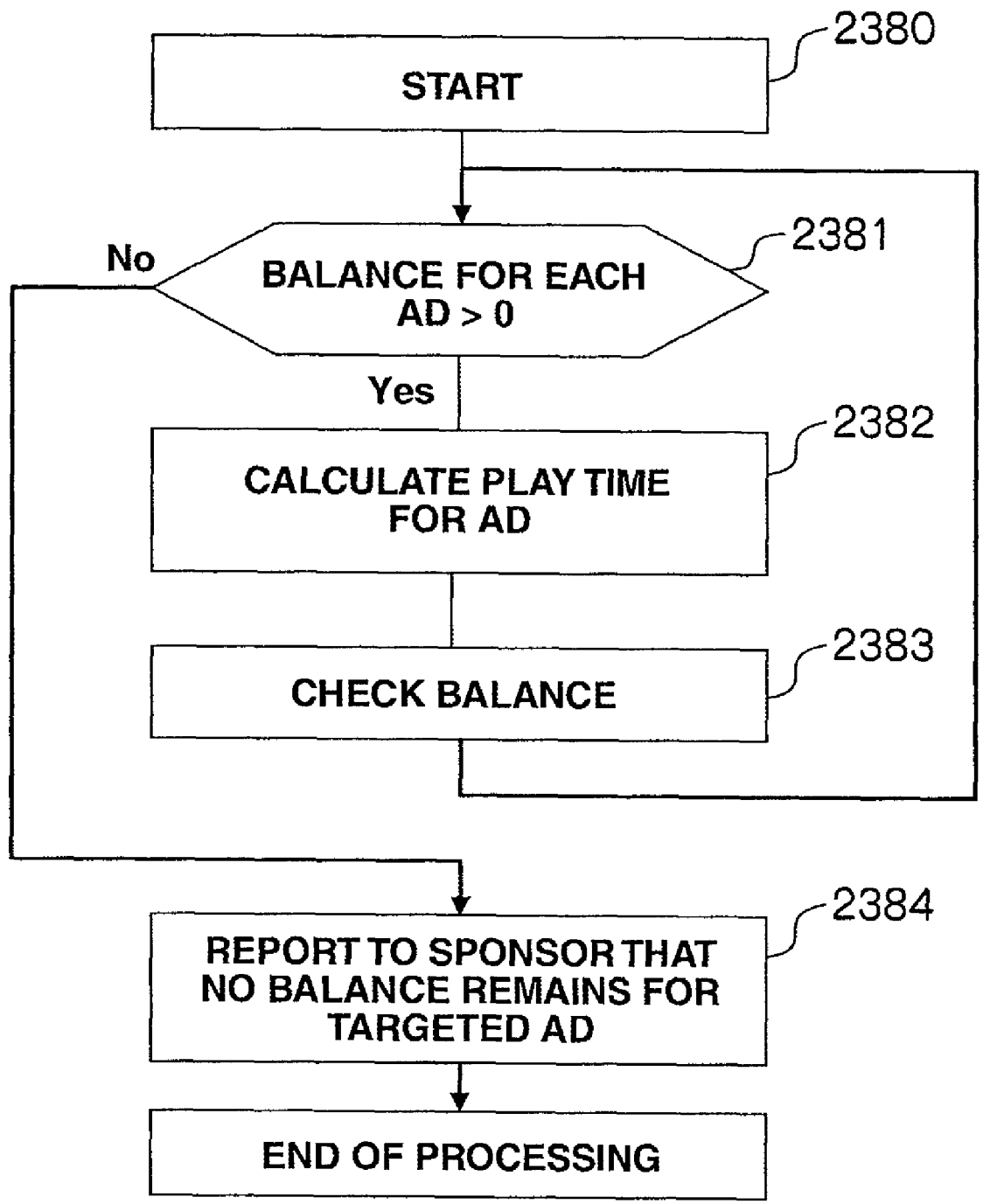
FIG. 27 shows a flowchart for performing balance management for each ad managed by the second storage device according to the above embodiment.

Next, a charge method will be described. In this charge method, reference times for the plural first storage devices 11 are compiled, and subtraction from the registered charge is performed for each ad file that has been registered by a user. FIG. 27 shows the relevant operation flow.

Step 2381: Whether or not there is a balance of the registered charge for an ad with a certain index is checked (balance 2395>0). If there is a balance, the processing proceeds to step 2382. On the other hand, if no balance is left, that will be reported to the sponsor via an e-mail (step: 2384) and the processing is terminated. Here, FIG. 28 is a table showing reference time 2394 and balance 2395 for each index ad 2391. This table will be referred to in the following description.

Step 2382: Play time for a target ad is calculated and registered as the reference time 2394. The total reference time of the plural first storage devices 11 is calculated. Here, the reference time of the personal computer 31 uses a viewing time counter 2800 (see FIG. 36) in a target information result that is transmitted when backup is conducted (to be described later). Step 2383: The balance is calculated by multiplying the value obtained in step 2382 for the index of the relevant ad in FIG. 28 by a unit amount for the relevant keyword in the above-described charge table. This value is subtracted from the total charge in the user setting values, and the resulting value of this calculation is displayed as the balance 2395. This charging method is only an example, and another method may be employed instead.

Figure 29:
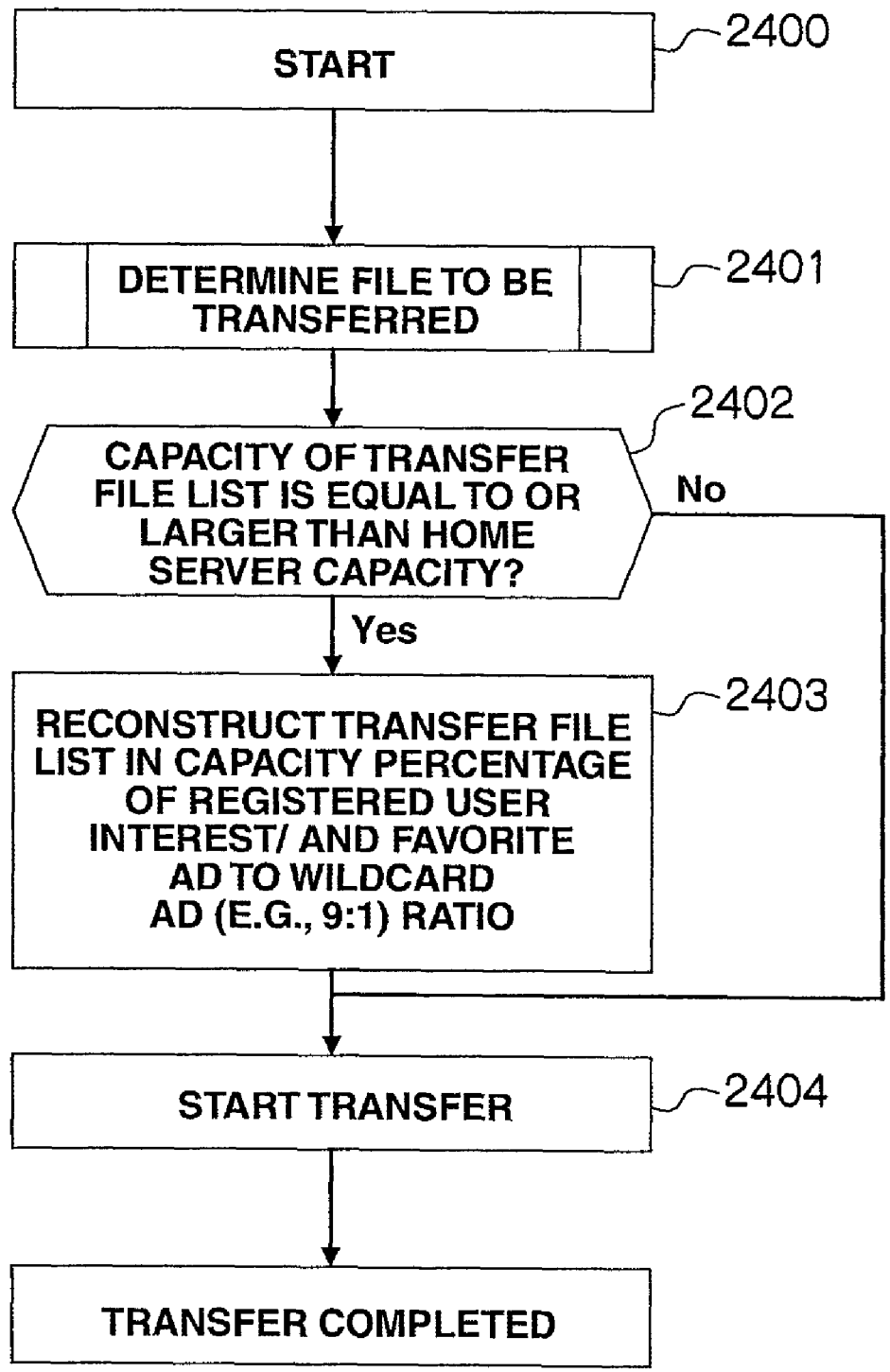
FIG. 29 is a flowchart showing an operation sequence for transferring an ad file in the second storage device according to the above embodiment.

Next, an ad distribution method will be described. FIG. 29 is a flowchart showing the ad distribution method. This processing is performed by the ad provision unit 134.

Step 2401: The ad provision unit 134 determines a transfer file using a transfer file determination method which will be described later in detail. Step 2402: The ad provision unit 134 checks via the WAN 40 if the capacity of the ad-use area 2031 in the first storage device 11 is enough for the amounts of files in the determined file list. If the capacity is not enough, the processing of step 2403 is performed, while if the capacity is enough, the processing of step 2404 is performed. Step 2403: The ad provision unit 134 reconstructs the transfer file list. An example of the reconstruction method may be as follows— entries for defined keywords are deleted in the percentage of defined keywords: wildcard=9:1. Step 2404: The ad data contained in the transfer file list and extracted target information relevant to the files in the transfer file list are transferred from the first storage device 11 to the second storage device 21.

Figure 30:
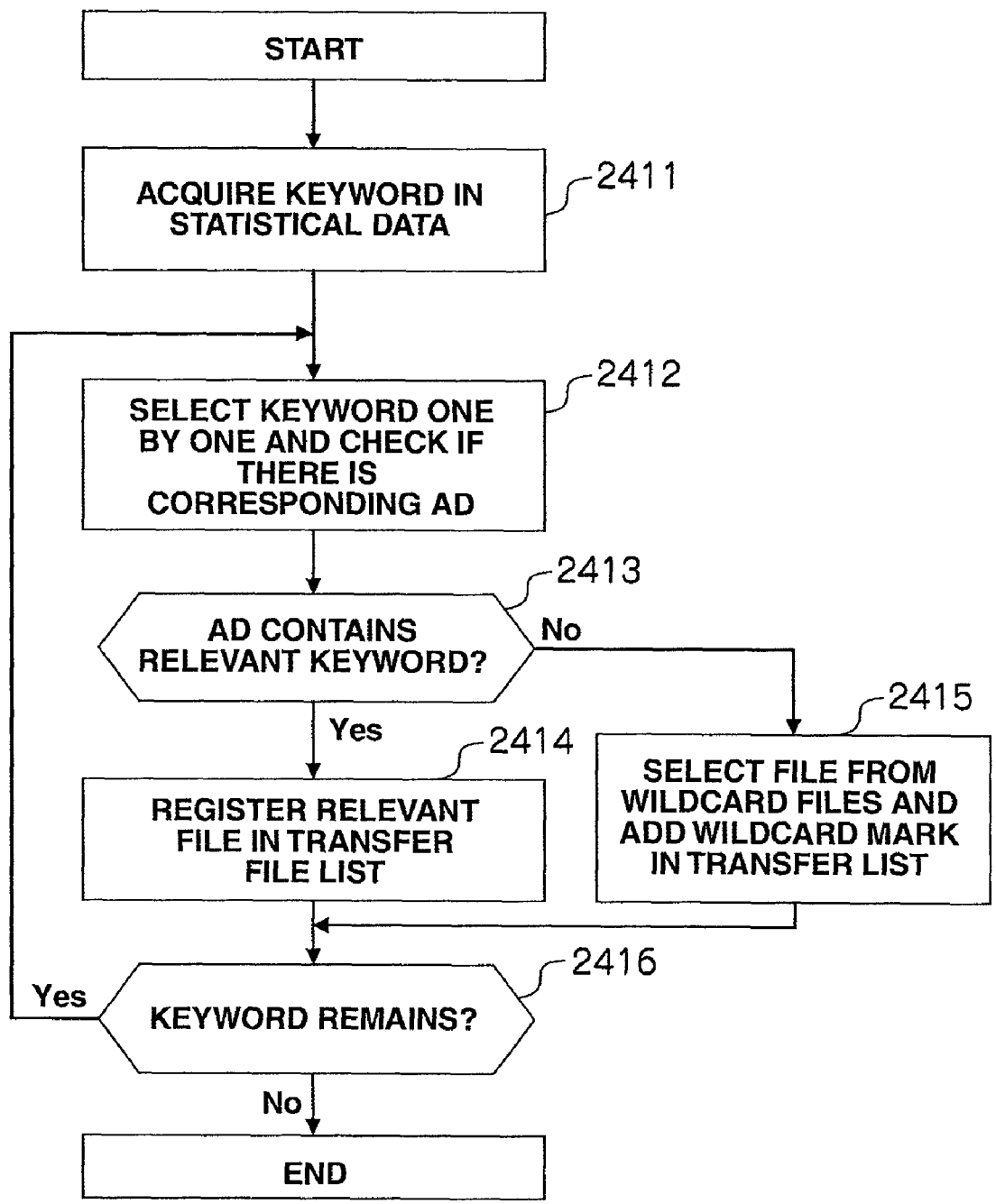
FIG. 30 is a flowchart for determining a to-be-transferred file from among the ad files in the second storage device according to the above embodiment.

FIG. 30 illustrates the determination method in step 2401 in detail. Step 2411: The statistical data 2320 is acquired. Step 2412: A keyword in the statistic data 2320 is selected and if there is an index corresponding to the keyword 2370 in FIG. 26. Step 2413: If the keyword found in step 2412 exists in the relevant ad, the processing proceeds to step 2414, while if that keyword does not exist in the relevant ad, the processing proceeds to step 2415. Step 2414: A file with the relevant index is registered in the transfer file list. Step 2415: Files are selected from the files designated as wildcards in descending order of ad charge, and the selected files are registered as the transfer files. Here the selected files are treated as wildcards. Step 2416: If there remains a keyword(s) on which the above processing has not been performed, the processing of step 2412 is repeated. On the other hand, if no keyword remains, the processing is terminated.

FIG. 31 shows the file list 3000 created in the processing described above with reference to FIG. 30. The file list 3000 includes an index 2417 assigned to a file, the file name 2418 of the file to be transferred, a target 2419 and an ad display time 2420. The files are stored in descending order of hit rate of the target. Regarding wildcard files, they are stored in descending order of ad charge that has been set by the user.

Meanwhile, user content, ad data and target data have been transferred to the first storage device 11. The reproduction method for content will be described below. In order to reproduce content in the first storage device 11, the user accesses the file provision unit 111 in the first storage device 11 via http, transfers a player for reproducing the content and displays the content on the PC 100 or on the television 12.

Figure 32:
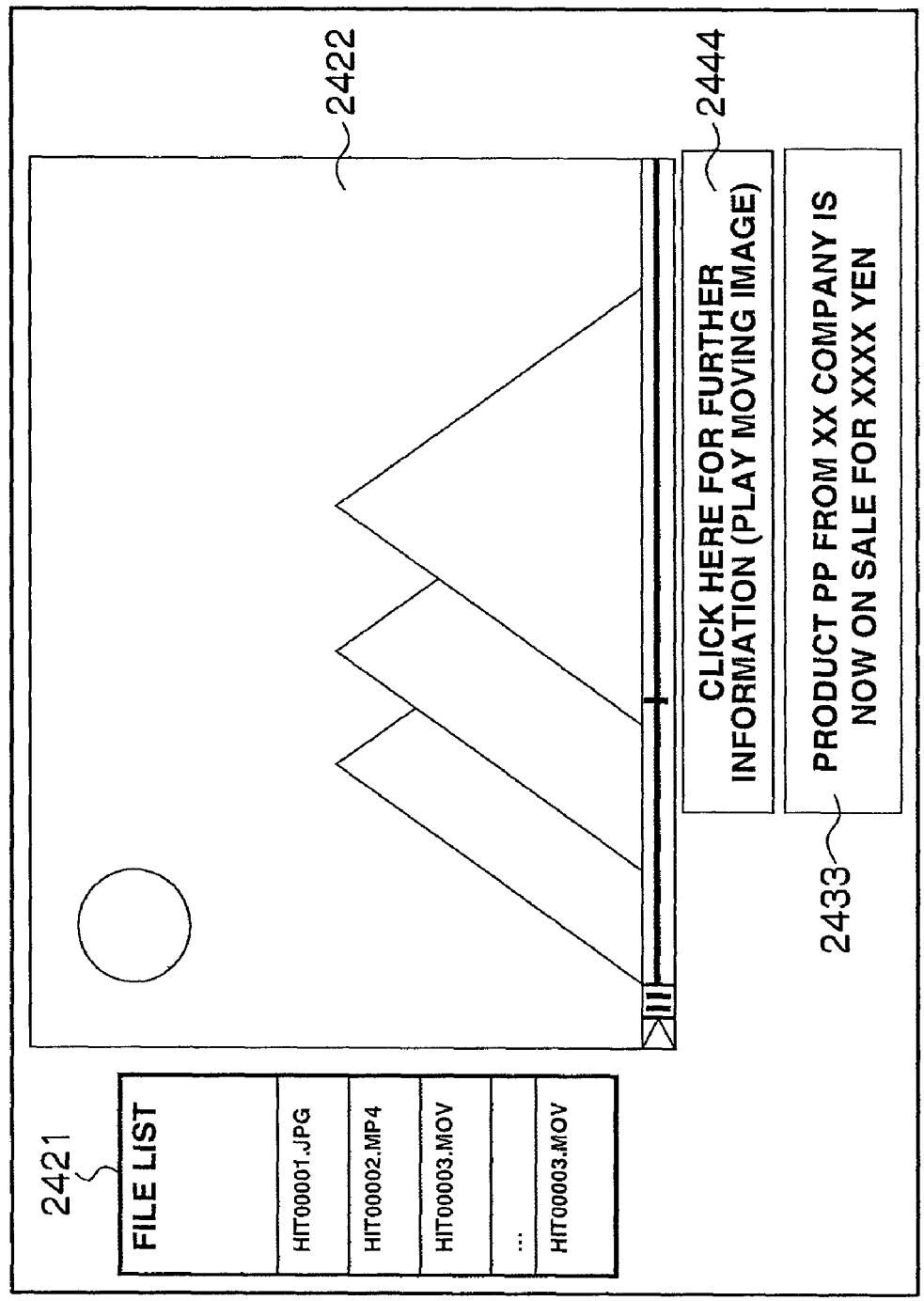
FIG. 32 shows a GUI for a player that is displayed in response to an access from the first storage device according to the above embodiment.

The outline of this player is shown in FIG. 32. The player in FIG. 32 includes a content list 2421 that shows stored content, a content reproduction section 2422 that reproduces a file selected from the content list 2421, an ad display section 2433 that displays an ad of a moving image like slide show or still image and a link section 2444 that displays links that can be accessed online or offline for additional information. Although the link section 2444 is separated from the ad display section 2433 for the convenience of explanation in the first embodiment, the ad display section 2433 itself may be configured as a link. In short, the ad display section 2433 may be configured so that an access can be made to additional information by clicking on the ad in this ad display section 2433.

Figure 33:
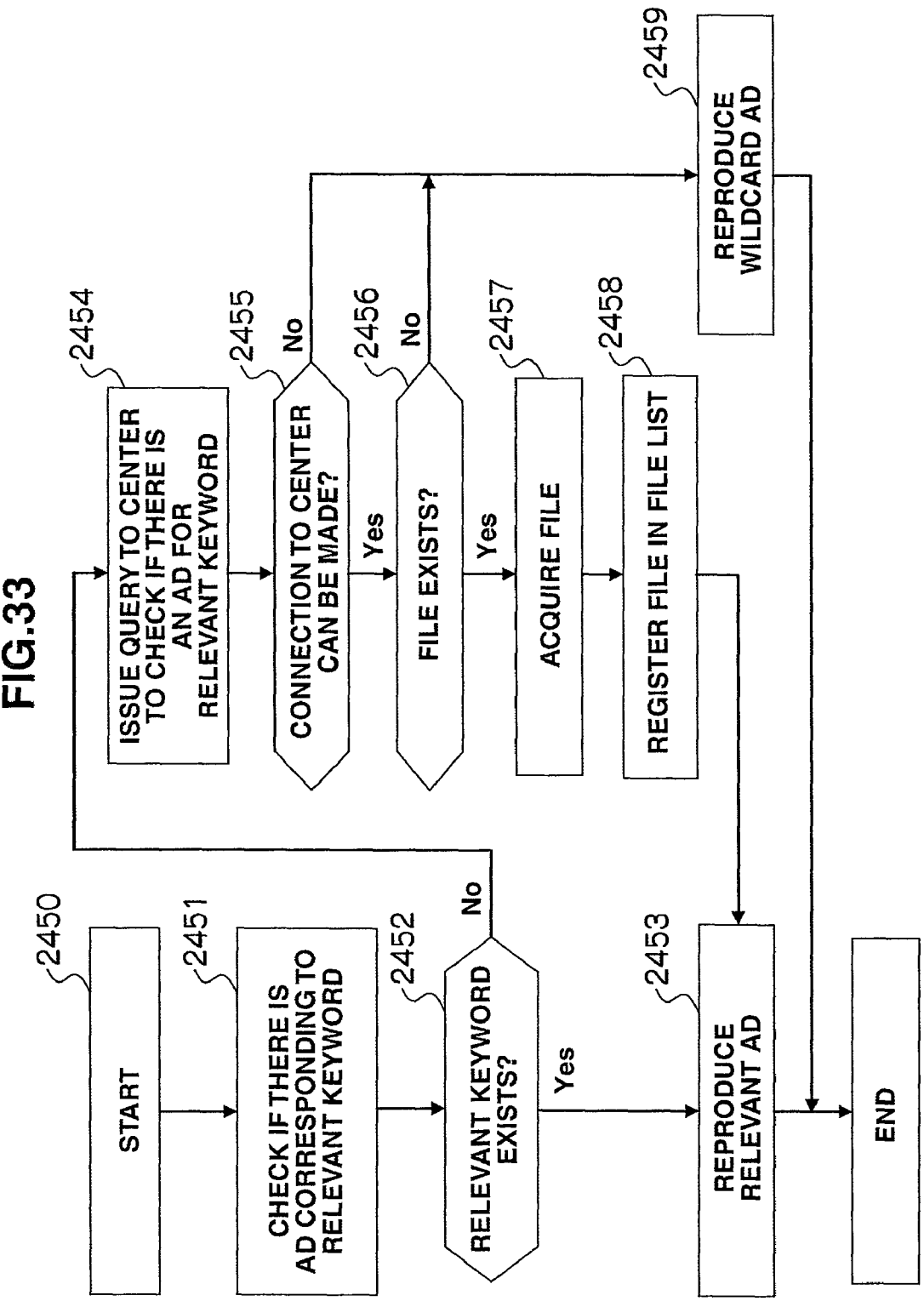
FIG. 33 shows processing for reproducing an ad corresponding to content in the first storage device according to the above embodiment.

FIG. 33 shows a flow for reproducing an ad when content is reproduced, and its description will be given below.

Step 2451: The file provision unit 111 checks whether or not the keyword 2231 (see FIG. 15) in the summary of the meta information of the selected file exists in the transferred file list 3000. Step 2452: If the keyword checked in step 2451 exists, the processing proceeds to step 2453. On the other hand, if the keyword does not exist, the processing proceeds to step 2454.

Step 2453: The ad relevant to the keyword is reproduced by the content reproduction section 2422. Step 2454: The file provision unit 111 issues a query to the ad provision unit 134 in the center to check if there is an ad containing the relevant keyword. Step 2455: If connection to the backup center 20 can be made successfully, the processing proceeds to step 2456. On the other hand, if connection to the backup center 20 cannot be made, the processing proceeds to step 2459. Step 2456: If the ad provision unit 134 in the backup center 20 provides a response indicating that there is a relevant file, the process proceeds to step 2457. On the other hand, if there is no relevant file, the processing proceeds to step 2459.

Step 2457: The file provision unit 111 receives the relevant file from the ad provision unit 134 in the backup center 20. At this time, a transfer method suitable for the wide area network such as ftp or WebDAV is employed. Step 2458: The received file is listed in the file list at the end of the files with the target keywords (just before the wildcards) in the file list 3000, and the file is stored in the ad area. Step 2459: If no ad for the relevant keyword cannot be found in the file list 3000, the wildcard ads are reproduced from the top by round robin. When the next content file is reproduced, the next ad is reproduced, so the processing proceeds to step 2453. This is the flow for reproducing the ad.

Figure 34:
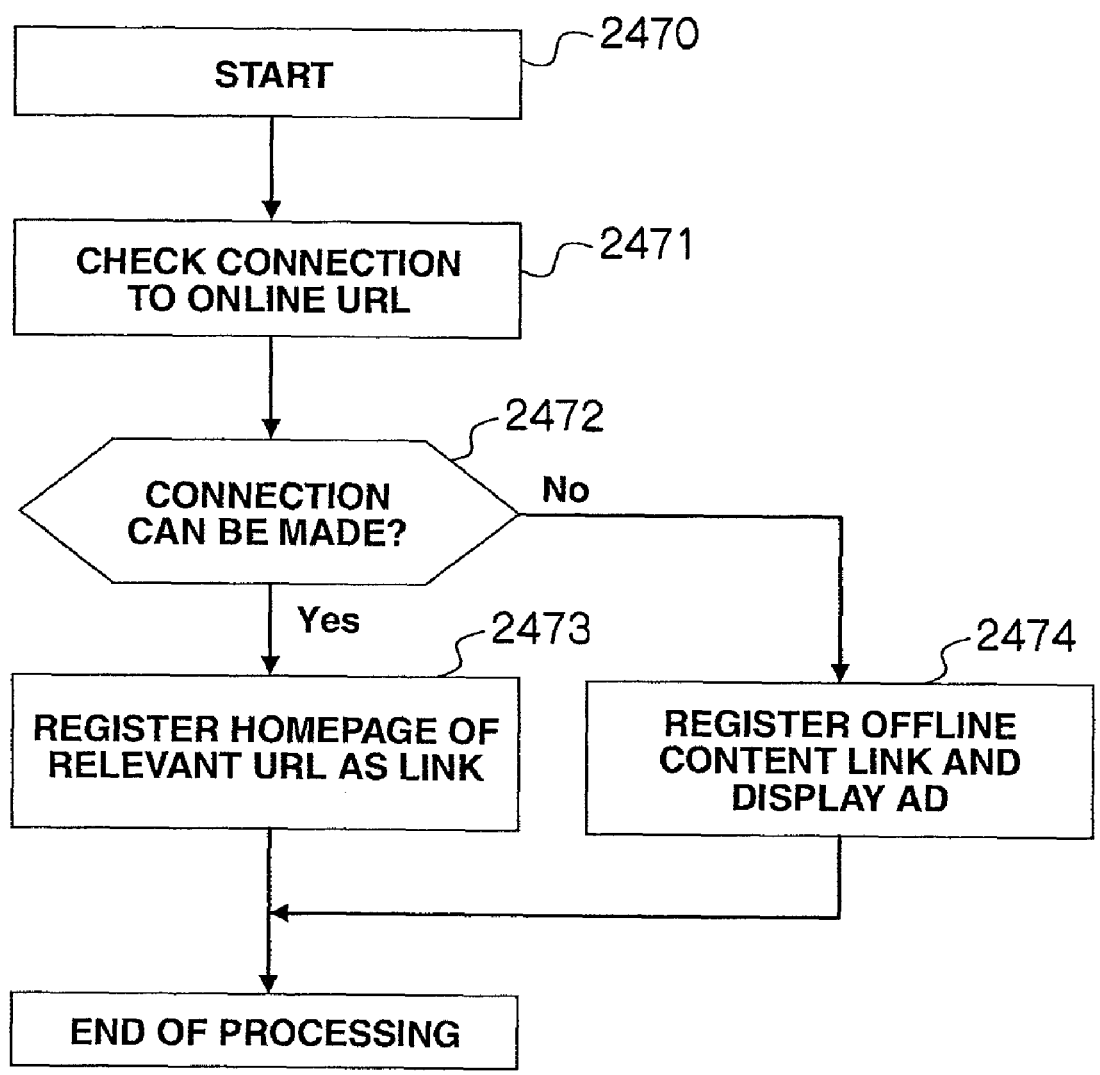
FIG. 34 is a flowchart showing how link information displayed on the first storage device is displayed according to the above embodiment.

When the next content is selected, the content of the online/offline link for the ad that has been found in the flow starting from step 2450 also needs to be changed. The processing at this time will be described below. FIG. 34 shows a flow for switching the content of offline/online links after the state of a linked target is checked. The content of this flow will be described below.

Figure 35:
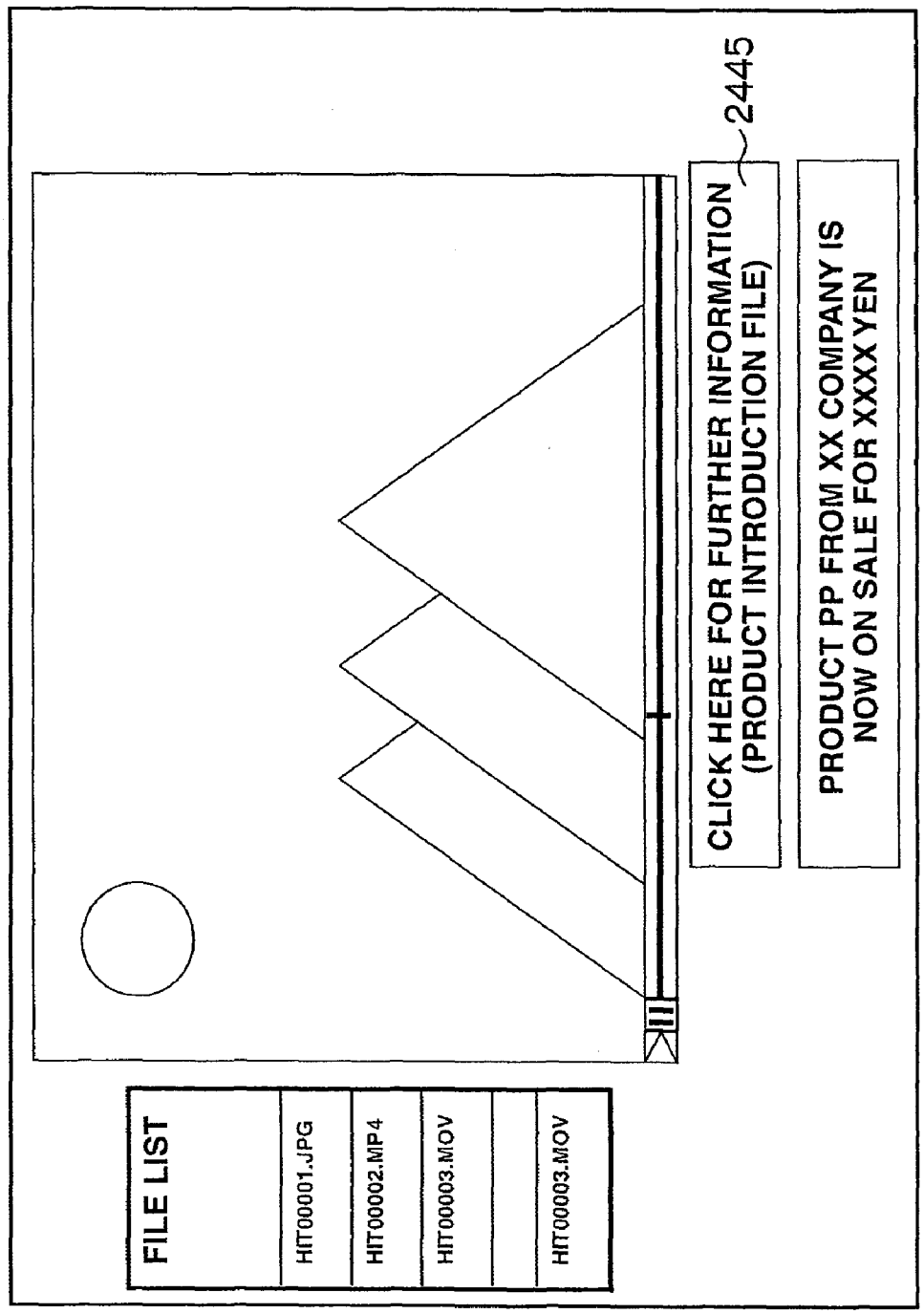
FIG. 35 shows a GUI when a player displayed in response to the access from the first storage device is off line according to the above embodiment.

Step 2471: The file providing section 111 accesses an online URL 3001 for the relevant ad. Step 2472: If the URL is accessible, the processing proceeds to step 2473. If the access cannot be made successfully, the processing proceeds to step 2474. Step 2473: The URL is registered as a homepage link. For example, 2444 in FIG. 32 corresponds to this homepage links. Step 2474: The link is registered as a link for offline content and an ad is displayed. For example, 2445 in FIG. 35 corresponds to this offline content link.

Figure 36:
FIG. 36 is a table showing the viewing time of the ad file displayed on the first storage device according to the above embodiment.
Figure 37:
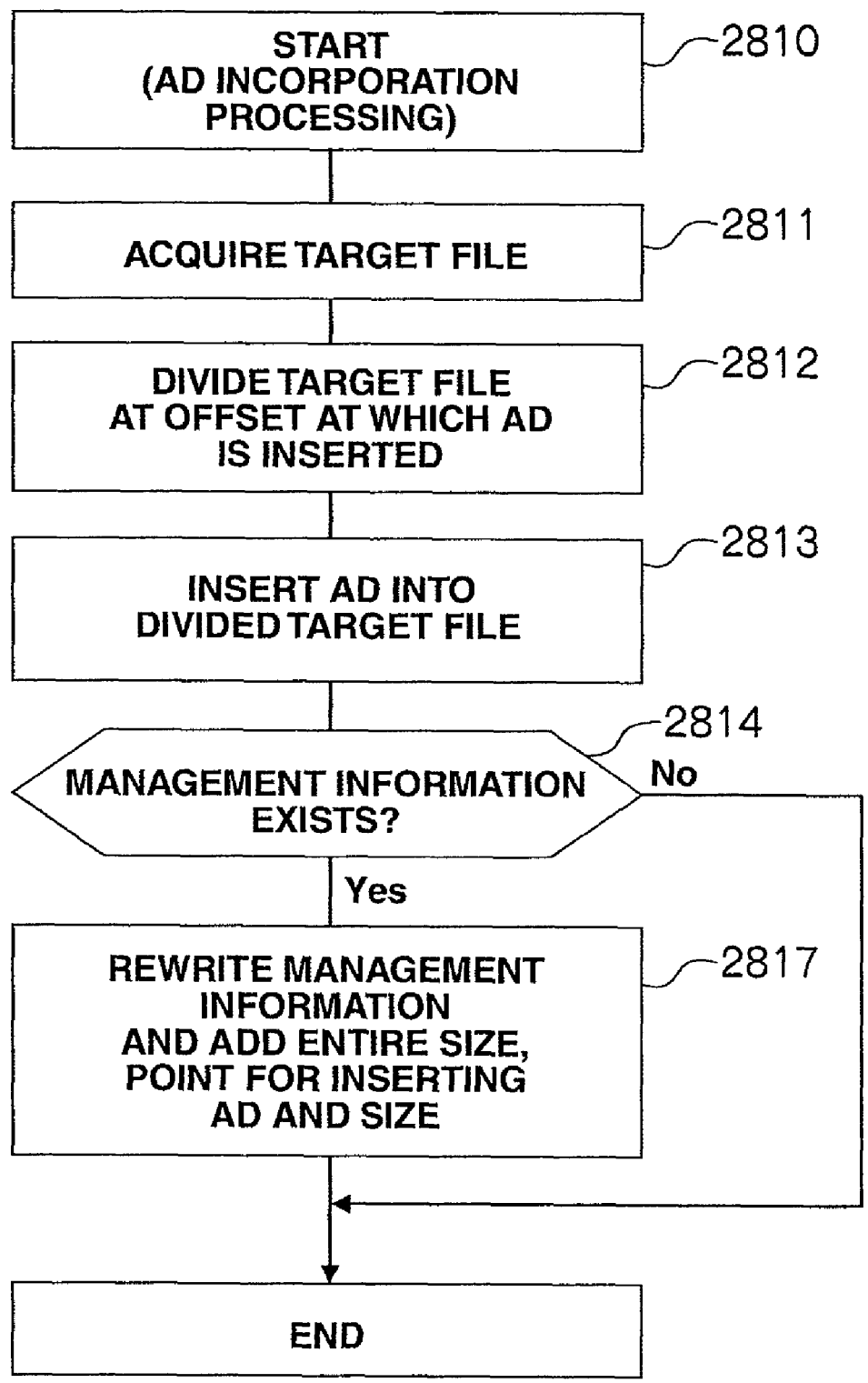
FIG. 37 is a flowchart for creating an in-content ad created in a first storage device according to a second embodiment of this invention.

FIG. 36 shows the accumulation of viewing time for each ad. When ad time for each ad 2433 ends, the html of only the ad portion is reread. Time (seconds) elapses from the start of the ad to the rereading at the end of the ad is counted and accumulated. This viewing time information 2800 is transferred together with the interest and favorite information by the interest and favorite unit 112 when backup is conducted.

Next, how backup data stored in the backup storage unit 133 is restored will be described. If a disk stored in the home-use area 117 in the first storage device 11 in the home 10 is broken, all data have to be restored. In order to perform this restoration, first, the user in the home 10 returns the first storage device 11 to the backup center. In the backup center 20, the assignment of the serial number 2056 is performed in a maintenance/management mode (the mode which only a maintenance personnel is allowed to use) of the management GUI in order to prepare a new first storage device 11 with the same serial number. During this restoration, after the new first storage device 11 is prepared, in accordance with the user's request to the backup center 20, an operator connects the new first storage device 11 to the second storage device 21 via the LAN 13 in the backup center 20. The operator assigns the serial number of the old first storage device 11 to the new first storage device 11, and the backup unit 132 refers to 2310 for registered files registered in the old first storage device 11 and the registered files are copied from the backup storage unit 133 to a home-use area 117 in the new first storage device 11.

Next, the relevant ad file is also extracted from the table 2370 and copied from the ad area 135 to the ad-use area 118. Information relevant to the first storage device 11, which is stored in the backup center, is also copied (from the interest and favorite information 131 to the interest and favorite information unit 116, from the target information storage area 136 to the storage information storage area 119, and from system configuration information 137 to the system configuration information 121). After the copy operation is completed, the operator disconnects the new first storage device 11 and returns it to the user home 10. The user connects the returned new first storage device 11 to the LAN 13 in the home 10. This method has a merit, as compared to a method to be described later, in which there is no need to update the serial number for plural files. Although an apparatus having a common serial number is used in the first embodiment, the identity of data may be ensured by rewriting the relevant serial number in the table 2370 in the backup center 20. This method has a merit in which the data in the old first storage device 11 and in the new first storage device can be stored as one piece of backup data, with no need to store plural pieces of backup data. Alternatively, all files in the home-use area 117 and all the ad files may be simply copied without changing the serial number when the new first storage device 11 is prepared, and the user may conduct, via the LAN 13, backup at his/her home for the new first storage device 11 as another apparatus. This method has a merit in which the data in the first storage device 11 can be stored, and in addition, the backup data for the old serial number can be stored.

The above is the description of the first embodiment. This embodiment has a merit in which it can provide an advertisement distribution system using the first storage device 11 capable of receiving ads for storing content created by the user at low cost, and allows the user to refer to the created content even when the first storage device 11 is in offline and cannot receive ads.

Second Embodiment

While the first storage device prepares a dedicated player in the first embodiment above, the first storage device accesses content files using a generally-used common network file system such as CIFS, SMB or NFS at home in the second embodiment. Although the same conceptual, logical and physical configuration diagrams as in the first embodiment are used, the processing is partly different from the first embodiment, The below description will mainly describe the differences.

For the basic processing, a common network file system is used for storing files, like in the first embodiment. This common network file system is used for reading instead of using the player in FIG. 32. However, during this reading, a file is transmitted with an ad incorporated in it. Examples using MPEG2 and MPEG4 will be described below.

In order to select content, a directory and a file are selected using a function in Windows (registered trademark) produced by Microsoft Corporation, Max OSX (registered trademark) produced by Apple Inc., etc. When a read access or an open access is made from the PC 100 or the like, the file provision unit 111 creates and transfers the content file with an ad file incorporated in it.

The flow for incorporating an ad will be described below. Step 2811: The file provision unit 111 acquires a target content file and creates a temporary replica for this file data. Step 2812: The replica data is divided at an offset at which an ad is inserted. For example, if commercial messages are to be inserted every 60 seconds, a frame is divided every 60 seconds. Step 2813: Advertisements are inserted between the divided portions. At this time, the format of the ad is converted so as to be suitable for the data. Step 2814: If the data format has management information (e.g., MPEG4), the processing proceeds to step 2817. On the other hand, if the data format does not have management information (e.g., MPEG2), the processing proceeds to step 2818.

Figure 38A:
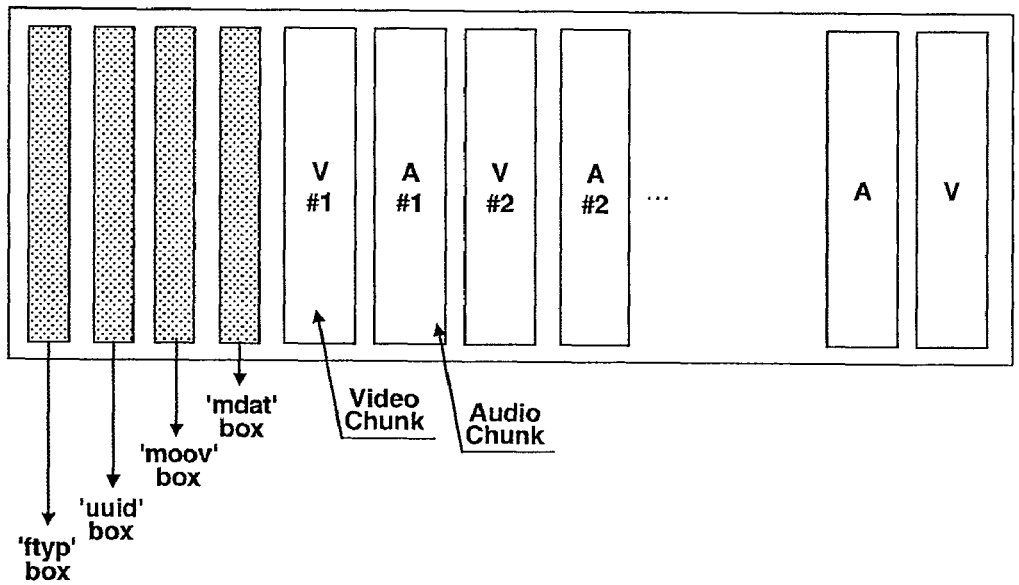
FIGS. 38A and 38B are conceptual diagrams
Figure 38B:
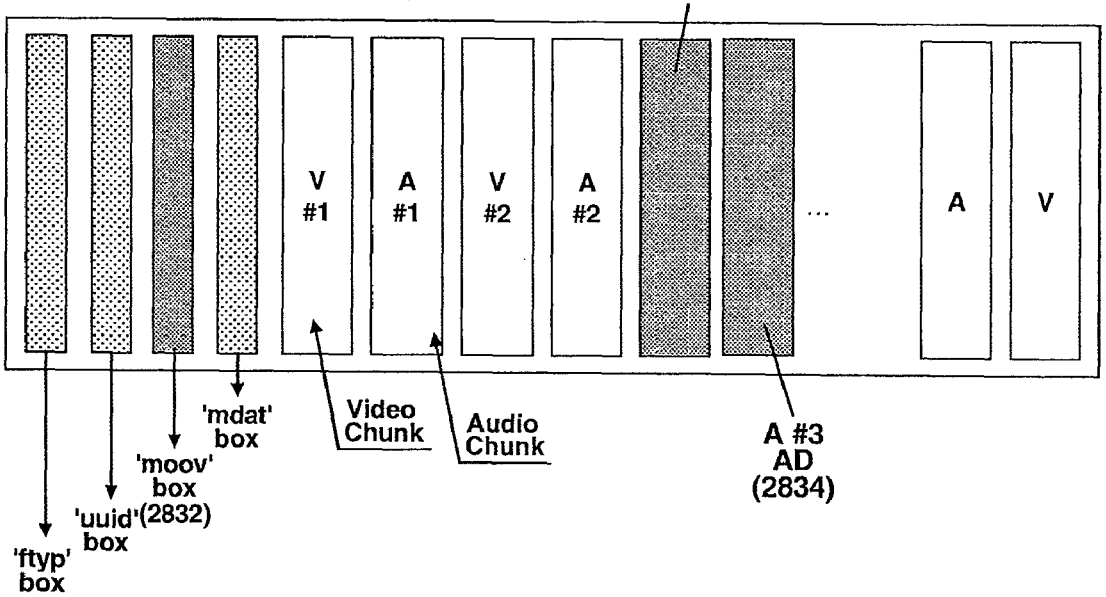

Step 2815: The MPEG4 has the management information as shown in gray in FIGS. 38A and 38B (see http://www.j-tokkyo.com/2007/H04N/JP2007-159058.shtml, for more detailed information), and if an ad is to be added, a point to add a track is described in a moov box. In the second embodiment, a video track V#3 and an audio track A#3 are added, a track for the management information moov box is also added to an offset value moov box, and the file size is changed.

Using this incorporation processing, content is created using an ad corresponding to the summary of the relevant content in step 2453 in the ad selection logic in FIG. 33, content is created likewise using an ad corresponding to a wildcard summary of the content in step 2459, replica data for the content is created and the data is returned in response to a read request from the host. Although processing examples for the MPEG2 and MPEG4 formats have been described in this embodiment, the format may be converted to the MPEG2 or MPEG4 before processing.

Also, although the link processing in FIG. 34 is not performed in the second embodiment, an online URL for ad may be added if a link can be added in the format of each content.

Lastly, the viewing time for each ad in FIG. 36 is obtained by, when a file access is made for an indexed ad, adding time of the inserted ad obtained based on the display time of the relevant ad to the count of the relevant viewing time counter.

Since this method uses a general network file system, platform-independent access can be made to target content.

Other Embodiments

The above descriptions have described embodiments in which this invention is applied to an advertisement distribution system that includes: a first storage device 11; a television 12 that displays information stored in the first storage device 11; and a second storage device 21 connected to the first storage device 11 via the WAN 40, in which the first storage device 11 includes: a home-use area 117 for storing content for a user who uses the first storage device 11; an interest and favorite information unit 116 for storing interest and favorite information relating to content extracted when the content is stored in the home-use area; the ad-use area 118 for storing ad data transmitted from the second storage device 21; and a backup unit 113 that transmits the content stored in the home-user area 117 and the interest and favorite information stored in the interest and favorite information unit 116 to the second storage device 21 at predetermined time, and the second storage device 21 includes: the ad area 135 for storing ad data; the backup storage unit 133 that stores the content transmitted from the backup unit 113; the interest and favorite information unit 131 that stores the interest and favorite information transmitted from the backup unit 113; and the ad provision unit 134 that selects from the ad area 135 ad data suitable for the interest and favorite information corresponding to the content and transmits the selected ad data to the first storage device 11, and in which the television 12 has a display unit (FIG. 32) that displays, when displaying the content stored in the home-use area 117, ad data suitable for the content to be displayed from the ads stored in the ad area 118. However, this invention is not limited to the above configuration.

Also, in the above description, this invention is applied in the configuration in which the second storage device 21 includes a target information unit 136 that stores target information showing the characteristics of ad data, and the target information providing unit 134 compares the interest and favorite information with the target information to select the ad data. However the invention is not limited to this configuration.

Furthermore, in the above description, this invention is applied in an configuration in which the first storage device 11 includes a target information storage unit 119 that stores the target information transmitted from the second storage device 21, and an ad provision unit 134 transmits the target information together with the ad data. This invention is not limited to this configuration.

In addition, by inserting an ad as a banner ad when a file or an application is used, this invention can be applied with respect to a wide variety of content, without limitation to moving images or still images.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. An advertisement distribution system, comprising:
a first storage device as a rental storage unit rented to a user at a user site, where rental charges incur for use of the first storage device;
a display apparatus that displays information stored in the first storage device; and
a second storage device provided at a site other than the user site, and connected to the first storage device via a network,
wherein the first storage device includes:
a first storage unit that stores content including user-created content which is created by a user who uses the first storage device;
a second storage unit that stores content-related information that relates to content extracted when the content is stored in the first storage unit;
a third storage unit that stores ad data transmitted from the second storage device;
a transmission unit that transmits the content stored in the first storage unit and the content-related information stored in the second storage unit, to the second storage device at a predetermined time,
a setting unit that allows user-setting of percentages of data area sizes for the first storage unit and the third storage unit, in comparison to a total size of the first storage device; and
a processing unit that calculates a discount price from a preset rental charge for the first storage device, based on the percentages set by the user, and calculates a reduced charge after subtracting the discount price from the rental charge;
wherein the second storage device includes:
a fourth storage unit that stores ad data;
a fifth storage unit that stores the content transmitted by the transmission unit;
a sixth storage unit that stores the content-related information transmitted by the transmission unit; and
an ad provision unit that selects ad data suitable for the content-related information corresponding to the content, from the fourth storage unit, and transmits the selected ad data to the first storage device, and
wherein the display apparatus includes a display unit that displays, when displaying the user-created content created by the user and stored in the first storage unit, subject ad data from the ad data stored in the third storage unit.

2. The advertisement distribution system according to claim 1, wherein:
the second storage device includes a seventh storage unit that stores target information showing a characteristic of the ad data, and
the ad provision unit selects ad data by comparing the content-related information with the target information.

3. The advertisement distribution system according to claim 2, wherein:
the first storage device includes an eighth storage unit that stores prepared target information transmitted from the second storage device, and
the ad provision unit transmits the prepared target information together with the ad data.

4. The advertisement distribution system according to claim 3, wherein the ad data to be displayed on the display apparatus, is selected from the fourth storage unit using the content-related information for selected content and the prepared target information.

5. The advertisement distribution system according to claim 4, wherein if, when the display apparatus attempts to display ad data and the ad data cannot be selected from the fourth storage unit, the first storage device issues a query to the second storage device about whether or not there is any ad data that can be selected based on the content-related information and the target information.

6. The advertisement distribution system according to claim 5, wherein, if the first storage device cannot make the query successfully, the display apparatus displays predetermined ad data stored in the fourth storage unit.

7. The advertisement distribution system according to claim 2, further comprising:
a personal computer connected to the second storage device and owned by a sponsor of the advertising data, wherein
the prepared target information is transmitted together with the ad data from the personal computer, to the second storage device.

8. The advertisement distribution system according to claim 1, wherein the display apparatus displays the calculated reduced charge on the display unit on the display apparatus.

9. The advertisement distribution system according to claim 8, wherein the display unit displays all of the rental charge, the discount price and the reduced charge.

10. The advertisement distribution system according to claim 1, wherein the display apparatus displays the ad data in a vicinity of, and in a same screen as the displayed user-created content.

11. The advertisement distribution system according to claim 1, wherein the predetermined time is a time based on a preset schedule.

12. An advertisement distribution system, comprising:
a first storage device as a rental storage unit rented to a user at a user site, where rental charges incur for use of the first storage device;

a display apparatus that displays information stored in the first storage device; and a second storage device provided at a site other than the user site, and connected to the first storage device via a network, wherein the first storage device includes:

a first storage unit that stores content including user-created content which is created by a user who uses the first storage device;

a second storage unit that stores content-related information that relates to content extracted when the content is stored in the first storage unit;

a third storage unit that stores ad data transmitted from the second storage device;

a transmission unit that transmits the content-related information stored in the second storage unit, to the second storage device at a predetermined time, a setting unit that allows user-setting of percentages of data area sizes for the first storage unit and the third storage unit, in comparison to a total size of the first storage device; and a processing unit that calculates a discount price from a preset rental charge for the first storage device, based on the percentages set by the user, and calculates a reduced charge after subtracting the discount price from the rental charge;

wherein the second storage device includes:

a fourth storage unit that stores ad data;

a fifth storage unit that stores the content-related information transmitted by the transmission unit; and an ad provision unit that selects, from the fourth storage unit, ad data suitable for the content-related information corresponding to the content by using the content-related information, and transmits the selected ad data to the first storage device for storage in the third storage unit, and wherein the display apparatus includes a display unit that displays, when displaying the user-created content created by the user and stored in the first storage unit, subject ad data from the ad data stored in the third storage unit.

* * * * *